US012515299B2

(12) United States Patent
Hoé

(10) Patent No.: US 12,515,299 B2
(45) Date of Patent: Jan. 6, 2026

(54) ALIGNMENT JIG AND HOLDING SYSTEM FOR A WORKPIECE

(71) Applicant: LEGO A/S, Billund (DK)

(72) Inventor: Mikkel Schildknecht Hoé, Billund (DK)

(73) Assignee: LEGO A/S, Billund (DK)

( * ) Notice: Subject to any disclaimer, the term of this patent is extended or adjusted under 35 U.S.C. 154(b) by 255 days.

(21) Appl. No.: 18/006,829

(22) PCT Filed: Jul. 29, 2021

(86) PCT No.: PCT/EP2021/071326

§ 371 (c)(1),
(2) Date: Jan. 25, 2023

(87) PCT Pub. No.: WO2022/023494

PCT Pub. Date: Feb. 3, 2022

(65) Prior Publication Data

US 2023/0278171 A1 Sep. 7, 2023

(30) Foreign Application Priority Data

Jul. 29, 2020 (DK) ............................. PA202070503

(51) Int. Cl.
*B25B 5/00* (2006.01)
*B25B 5/14* (2006.01)
*B25B 5/16* (2006.01)

(52) U.S. Cl.
CPC ................ *B25B 5/163* (2013.01); *B25B 5/14* (2013.01)

(58) Field of Classification Search
CPC ............ B25B 5/003; B25B 5/14; B25B 5/163
See application file for complete search history.

(56) References Cited

U.S. PATENT DOCUMENTS 2,054,572 A 9/1936 McKenna
2,422,773 A * 6/1947 Colwill .................. B25B 5/147 279/115
3,899,162 A * 8/1975 Fischer ..................... B25B 1/02 269/25

(Continued)

FOREIGN PATENT DOCUMENTS

CN 210476264 U 5/2020
DE 102008019589 A1 10/2009

(Continued)

OTHER PUBLICATIONS

DK Office Action in PA 2020 70503 dated Jan. 27, 2021, 8 pages.

(Continued)

*Primary Examiner* — Lee D Wilson

(74) *Attorney, Agent, or Firm* — Day Pitney LLP; George Chaclas; Anthony A. Kassas

(57) ABSTRACT

An alignment jig for holding and aligning a workpiece. The alignment jig has a base configured to support the workpiece and a first jaw extending from the base. The first jaw has a wedge-shaped flange defining opposing, angled alignment surfaces. The alignment jig also has a second jaw extending from the base of the alignment jig opposite the first jaw. The second jaw is moveable relative to the base such that the second jaw is configured to clamp a workpiece inserted between the first and second jaw against the alignment surfaces.

20 Claims, 16 Drawing Sheets

(56) References Cited

U.S. PATENT DOCUMENTS

| | | | | |
|---|---|---|---|---|
| 6,017,263 | A * | 1/2000 | Dwyer | B23Q 3/063 451/28 |
| 6,068,541 | A * | 5/2000 | Dwyer | B23Q 3/063 451/28 |
| 6,139,412 | A * | 10/2000 | Dwyer | B24B 19/14 451/365 |
| 6,186,867 | B1 * | 2/2001 | Dwyer | B24B 41/06 451/28 |
| 6,287,182 | B1 * | 9/2001 | Dwyer | B25B 5/14 451/365 |
| 8,066,270 | B2 * | 11/2011 | Siegel | B25B 1/2452 269/282 |
| 8,967,606 | B2 * | 3/2015 | Hamm | B25H 1/16 269/130 |
| 2003/0066820 | A1 | 4/2003 | Byrnes et al. | |
| 2007/0013104 | A1 | 1/2007 | Axelrod | |
| 2009/0096143 | A1 | 4/2009 | Wampler, II | |
| 2018/0281202 | A1 | 10/2018 | Brudniok et al. | |
| 2023/0278171 | A1 * | 9/2023 | Hoé | B25B 5/163 269/47 |

FOREIGN PATENT DOCUMENTS

| | | | |
|---|---|---|---|
| EP | 1403002 | A2 | 3/2004 |
| EP | 1437199 | A1 | 7/2004 |
| KR | 10-20160127423 | A | 11/2016 |

OTHER PUBLICATIONS

International Preliminary Report on Patentability for International Application No. PCT/EP2021/071326, dated Nov. 11, 2022, 6 pages.

* cited by examiner

ALIGNMENT JIG AND HOLDING SYSTEM FOR A WORKPIECE

CROSS-REFERENCE TO RELATED APPLICATIONS

The present application is a U.S. National Stage Application of Inter-national Application No. PCT/EP2021/071326, filed on Jul. 29, 2021 and published on Feb. 3, 2022 as WO 2022/023494 A1, which claims the benefit and priority of Danish Patent Application No. 202070503, filed on Jul. 29, 2020, each of which is incorporated herein by reference in its entirety for any purpose whatsoever.

FIELD OF THE DISCLOSURE

The present disclosure relates to an alignment jig for holding a workpiece during an after-treatment process after the workpiece as such has been formed. The disclosure also relates to a holding system comprising at least on alignment jig and at least one workpiece, and which is configured for holding the at least one workpiece during an after-treatment process, thereof. The disclosure also relates to a workpiece comprising sub-parts for a toy item and having means for being held steadily during an after-treatment process of the workpiece.

BACKGROUND

When making multi-component items such as toys, for example toy figurines, from plastic, there is a need for easy manufacture and easy post manufacture processes (after treatment processes) and for easy of assembly of any sub-parts or components of the item.

It is known to mould such components or sub-parts of in workpieces comprising two or more sub-parts. Thereby the manufacturing process may be accelerated. Often the workpieces are connected by runners of the moulding process, which runners are need to be removed before the sub-parts are assembled, and if present during any after-treatment process of the workpiece may hinder or complicate the after-treatment process. Such an after-treatment may for example be printing/placement of decorations, spray painting, or the like on the sub-parts of the workpiece. It is also known that it is difficult to accurately provide such printing/placement of decorations, spray painting, or the like on the sub-parts of the workpiece, because it is difficult to correctly control the positioning of the workpiece relative to the machinery performing the after-treatment process.

It is an object of the disclosure to alleviate the above mentioned difficulties.

SUMMARY

In a first aspect the objects of the disclosure may be achieved by an alignment jig for holding a workpiece during after-treatment, wherein the workpiece comprises

- a first alignment surface;
- a second alignment surface adjacent to and angled respective to the first alignment surface,
- wherein the alignment jig comprises a set of jaws configured to grab and hold the workpiece between a first jaw and a second jaw of the set of jaws,
- wherein the second jaw is movably arranged relative to the first jaw;

- wherein the first jaw comprises a first alignment surface configured for engaging the first alignment surface of the workpiece.
- wherein the first jaw comprises a second alignment surface configured for engaging the second alignment surface of the workpiece,
- wherein the second jaw comprises a first abutment surface, the first abutment surface being vertically arranged and configured for engaging a second side surface of the workpiece, and
- wherein the second jaw further comprises a second abutment surface, the second abutment surface facing downwards, and being configure for engaging a upwardly facing surface of the workpiece, when the workpiece is inserted between the set of jaws of the alignment jig.

The first abutment surface on the second jaw thereby is configured the press the first and second alignment surfaces of the workpiece against the first and second alignment surfaces of the first jaw, respectfully, and thereby align the workpiece correctly in the alignment jig.

The second abutment surface on the second jaw thereby further is configured to hold the workpiece down in the alignment jig.

The first jaw is preferably arranged adjacent to the second jaw.

The first jaw and the second jaw, are arranged such that a distance—when the second jaw is in a rest position—between the first and/or second alignment surfaces of the first jaw and the first abutment surface of the second jaw is smaller than a distance between the first and/or second alignment surfaces of the workpiece and the second surface of the workpiece, which the alignment jig is configured for holding.

In an embodiment, the first alignment surface and the second alignment surface on the first jaw forms part of a wedge-shaped indentation in the first jaw. This embodiment is suitable for workpieces having first and second alignment surfaces formed adjacent to and angled to each other in a protruding wedge shape.

In an embodiment the second jaw comprises two sets of first and second abutment surfaces arranged on two vertical surfaces of the second jaw, where the two vertical surfaces are arranged in a wedge shape protruding from the second jaw.

This embodiment is suitable for workpieces having first and second alignment surfaces formed adjacent to and angled to each other in a wedge shape indention.

In a further embodiment, the second jaw comprises an elongate body having a base fixedly connected to the alignment jig and a rod connected to and extending from the base, wherein at least the rod is formed in an elastically resilient material.

The elastic resilient properties of the material of the rod are preferably configured such that the rod is allowed to bend relative to the base of the elongate body of the second jaw, if a sideways pressure is applied to an upper portion (formed opposite to the base of the elongate body) of the rod and swing back to its original position, when the pressure is removed from the upper portion of the rod.

Thereby, at least the upper portion of the rod may be movably arranged relative to the alignment jig as such. Thereby, if a suitably configured workpiece is pressed into the alignment jig, at least the upper portion of the rod is bend away from its rest position and will create a bias towards its rest position on a portion of the workpiece. This is utilized provide a bias on the workpiece and force the first and alignment surfaces of the workpiece towards the first and second alignment surfaces of the first jaw of the alignment jig.

In these embodiments the first abutment surface on the second jaw is preferably arranged at the upper portion/end of the rod of the second jaw.

In these embodiments the second abutment surface is preferably arranged at the upper portion/end of the rod of the second jaw.

In a further embodiment of any of the previously described embodiments, the second jaw is biased in towards the first jaw.

In a further embodiment of any of the previously described embodiments the second jaw is pivotally connected relative to the first jaw.

In an alternative embodiment, where the alignment jig for holding a workpiece during after-treatment, is configured for workpieces comprising

- two sub-parts; and
- an intermediary portion formed between the two sub-parts;

the first alignment surface is formed in a first side surface of the intermediary portion; and the second alignment surface is formed in the first side surface of the intermediary portion, and

- wherein first abutment surface of the second jaw is configured for engaging a second side surface of the intermediary portion,
- wherein the first alignment surface of the first jaw is configured for engaging the first alignment surface on the intermediary portion of the workpiece and wherein the second alignment surface of the first jaw is configured for engaging the second alignment surface on the intermediary portion of the workpiece, and
- wherein the first alignment surface and the second alignment surface on the first jaw are angled with respect to each other.

The cooperating alignment surfaces on the alignment jig and the workpiece allows centering/Alignment of the workpiece in the alignment jig for accurate after-treatment, e.g. printing on the workpiece.

In an embodiment the first alignment surface and the second alignment surface on the first jaw forms part of a wedge-shaped flange protruding from the first jaw.

The corresponding alignment surfaces on the workpiece thereby may be provided as a correspondingly wedge-shaped indent in the intermediary portion of the workpiece, whereby the arrangement allows that the wedge-shaped indent on the workpiece may serve the dual purpose of aligning and as weakened zone of reduced material thickness, such that the sub-parts of the workpiece may be easily separated.

In an embodiment, the wedge-shaped flange is formed centrally on the alignment jig and configured to engage as centrally located wedge shaped indentation on the intermediary portion of the workpiece.

In embodiments, the first and second jaws may both be fixed/stationary relative a base, e.g. a plate body of the alignment jig. In this case one or both of the jaws may be provided with a resilience, such that a workpiece may be snapped in between the two jaws.

However, preferably the second jaw is moveable relative to the first jaw.

In an embodiment, the second jaw is biased in towards the first jaw.

In further embodiments, the second jaw is pivotally connected to the alignment jig, such that it is pivotal relative to the first jaw.

In further embodiments, the abutment surface of the second jaw is provided on a head portion which is pivotally connected to a body of the second jaw. When also the body of the second jaw is pivotally connected to the alignment jig, this allows a transfer of a vertical movement into a horizontal movement of the abutment surface of the second jaw towards the first jaw, in a space reducing manner.

In either of the embodiments of the alignment jig according to the first aspect, each alignment jig is configured with a single first jaw and a single second jaw, and therefore a single alignment jig is configured to hold a single workpiece at a time.

In a second aspect the objects of the disclosure are achieved by a holding system for holding and aligning a workpiece during after-treatment of the workpiece, the holding system comprising

- a workpiece; and
- an alignment jig according to any one of the embodiments of the first aspect of the disclosure listed above;
- wherein the workpiece comprises
- a first alignment surface;
- a second alignment surface adjacent to and angled respective to the first alignment surface.

In an embodiment, the alignment jig of the holding system comprises attachment means for coupling the alignment jig to a robot arm and/or to a main jig.

In a further embodiment, the holding system may comprise a plurality of alignment jigs attached to a main jig in an array of alignment jigs.

In a further embodiment of any of the above embodiments of the second aspect of the disclosure, the first alignment surface of the workpiece and the second alignment surface of the workpiece are arranged adjacent to each other in a wedge shape on outer surfaces of the workpiece, and wherein the first alignment surface and the second alignment surface on the first jaw forms part of a wedge-shaped indentation in the first jaw.

In a further embodiment of any of the above embodiments of the second aspect of the disclosure, the second side surface of the workpiece comprises two surface sections formed adjacent to each other and in a wedge shape;

- wherein the second jaw comprises two sets of first and second abutment surfaces arranged on two vertical surfaces of the second jaw (180), where the two vertical surfaces are arranged in a wedge shape protruding from the second jaw; and
- wherein one of the two sets of first and second abutment surfaces are configured to about on one of the two surface sections of the workpiece, and the other of the two sets of first and second abutment surfaces are configured to abut on the other of the two surface sections of the workpiece.

In an embodiment, the workpiece or a portion thereof is shaped in a wedge.

In an embodiment, the workpiece is shaped as a pie-piece.

In an alternative embodiment of the second aspect of the disclosure the workpiece comprises

- two sub-parts;
- an intermediary portion formed between the two sub-parts;
- a first alignment surface formed in a first side surface of the intermediary portion; and
- a second alignment surface formed in the first side surface of the intermediary portion.

In an embodiment thereof, the holding system comprises a plurality of alignment jigs attached to a main jig in an array of alignment jigs.

In a further embodiment, the main jig comprises a main body having an upper surface on which the plurality of alignment jig are attached.

wherein, for each alignment jig, a bore is provided perpendicularly to a plane defined by the upper surface, wherein a spring is provided in each bore, and wherein the second jaw of each alignment jig is biased towards the first jaw of the respective alignment jig by the spring.

Thereby a very compact holding system may be provided.

In either of the embodiments of the holding system according to the second aspect, each alignment jig is configured with a single first jaw and a single second jaw, and therefore each alignment jig is configured to hold a single workpiece at a time.

In a third aspect objects of the disclosure are achieved by a workpiece comprising two sub-parts;

an intermediary portion formed between the two sub-parts:

a first alignment surface formed in a first side surface of the intermediary portion; and a second alignment surface formed in the first side surface of the intermediary portion.

wherein the first alignment surface and the second alignment surface are angled with respect to each other, and with respect to the first side surface.

Thereby a workpiece, which may be easily aligned for after-treatment is obtained.

In an embodiment, the first alignment surface and the second alignment surface of the workpiece forms part of a wedge-shaped indent into the intermediary portion. The wedge-shaped indent on the workpiece may serve the dual purpose of aligning and as weakened zone of reduced material thickness, such that the sub-parts of the workpiece may be easily separated In an embodiment, the wedge-shaped indent is formed centrally on the intermediary portion of the workpiece.

In either embodiment of either of the above mentioned aspects of the disclosure, the workpiece may be injection moulded workpiece.

It should be emphasized that the term “comprises/comprising/comprised of” when used in this specification is taken to specify the presence of stated features, integers, steps or components but does not preclude the presence or addition of one or more other features, integers, steps, components or groups thereof.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

DETAILED DESCRIPTION

Figure 1:
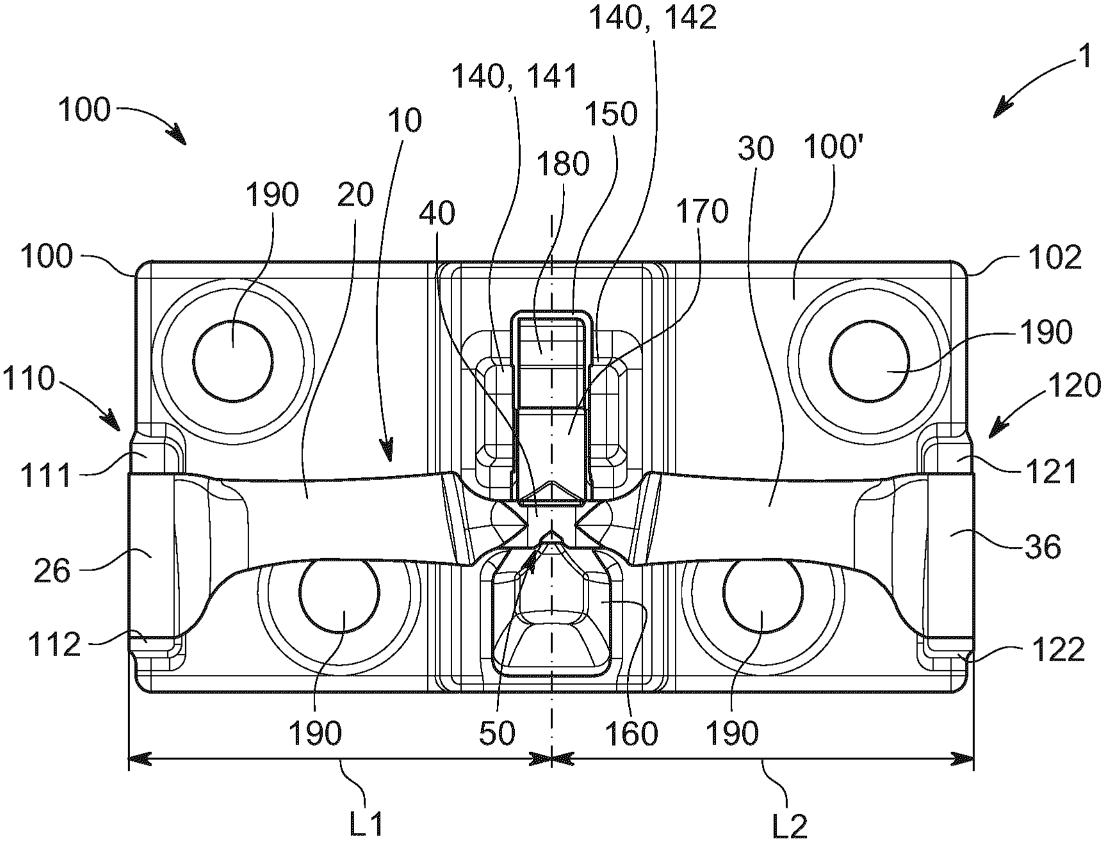
FIG. 1, in a top view, shows a holding system for holding and aligning a workpiece according to one aspect of the disclosure, and comprising as jig according to another aspect of the disclosure and a workpiece according yet another aspect of the disclosure.

The subject technology overcomes many of the prior art problems associated with alignment devices. The advantages, and other features of the technology disclosed herein, will become more readily apparent to those having ordinary skill in the art from the following detailed description of certain preferred embodiments taken in con-junction with the drawings which set forth representative embodiments of the present technology and wherein like reference numerals identify similar structural elements. Directional indications such as upward, downward, right, left and the like are used with respect to the figures and not meant in a limiting manner.

The present disclosure relates to a holding system 1, the holding system 1 being configured for holding and aligning a workpiece 10 during after-treatment of the workpiece 10, after forming the workpiece 10 as such. The disclosure also relates to an alignment jig 100, which may form part of the holding system 1, the alignment jig 100 being configured for holding and aligning a workpiece 10 during after-treatment of the injection moulded workpiece 10. The disclosure further relates to workpiece 10, which is adapted to be easily held in an alignment jig 100, such as referred to in the previous sentence. Such workpieces 10 may form part of the mentioned holding system 1.

The workpiece 10 is preferably made in plastic. The workpiece 10 may be formed by moulding. Preferably, the workpiece 10 is an injection moulded workpiece.

Figure 2A:
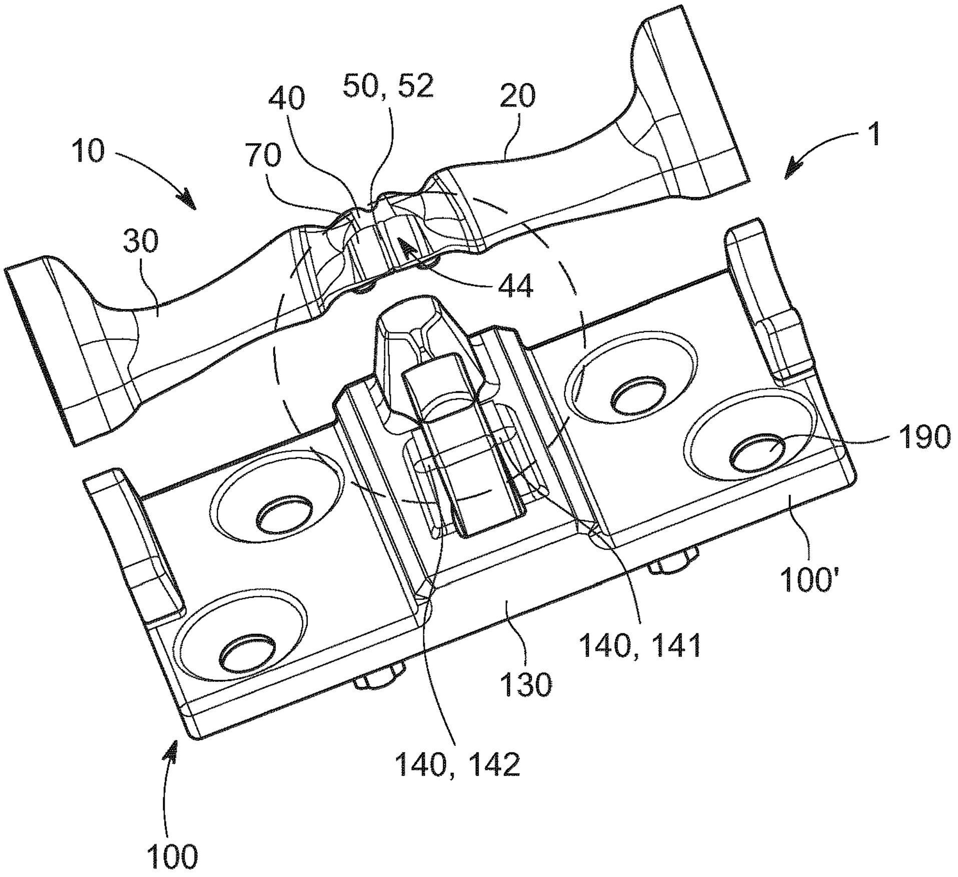
FIG. 2A, in a perspective view, shows the system for holding and aligning a workpiece of FIG. 1, from one side and with the workpiece separated from the jig.
Figure 3A:
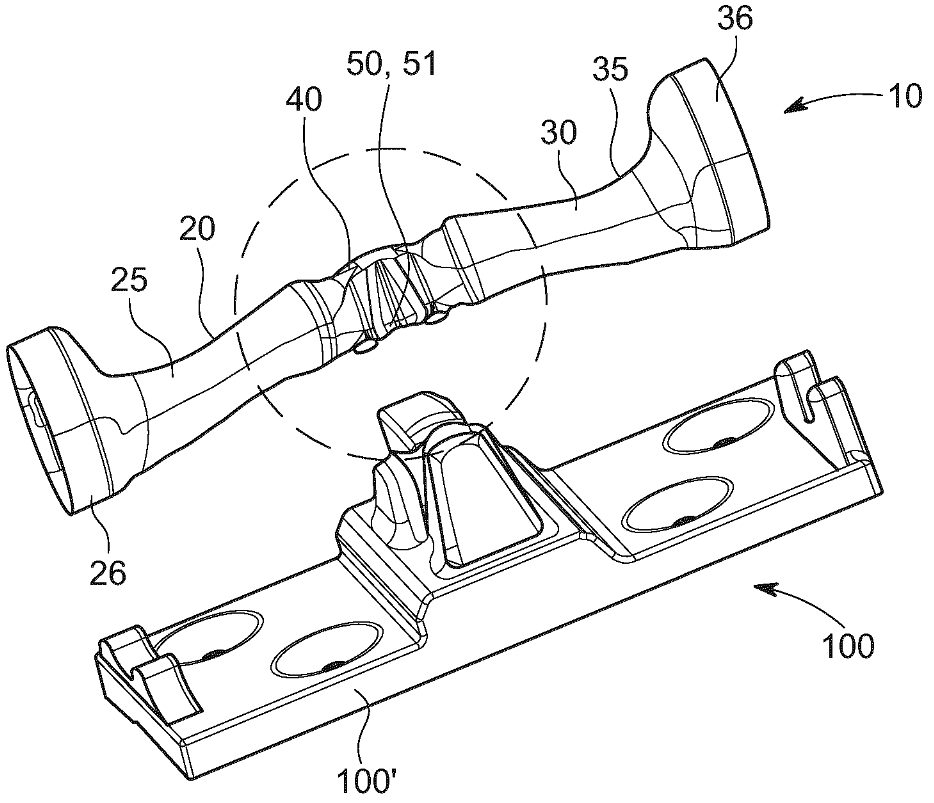
FIG. 3A, in a perspective view, shows the system for holding and aligning a workpiece of FIG. 1, from the opposite side relative to the view in FIG. 2A, and with the workpiece separated from the jig.
Figure 4:
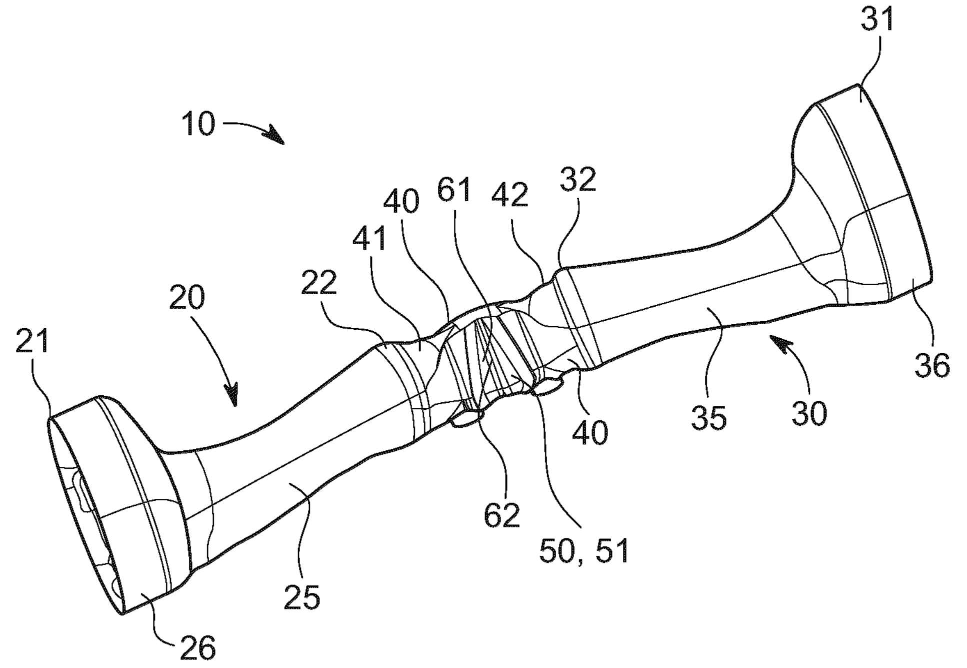
FIG. 4, in a perspective view, shows an enlarged view of the workpiece from one side.

FIG. 1, in a top view, shows a holding system 1 according to an embodiment thereof, and comprising an injection moulded workpiece 10 held by and aligned in an alignment jig 100. FIGS. 2A and 3A, in perspective views, show the injection moulded workpiece 10 and the alignment jig 100 in a separated state. FIG. 2A shows the injection moulded workpiece 10 and the alignment jig 100 from one side, and FIG. 3A shows the injection moulded workpiece 10 and the alignment jig 100 from the opposite side. FIG. 4, in a perspective view, shows the workpiece 10 from one side. FIGS. 7A-D show other views of the alignment jig 100 of the holding system 1.

Figure 2B:
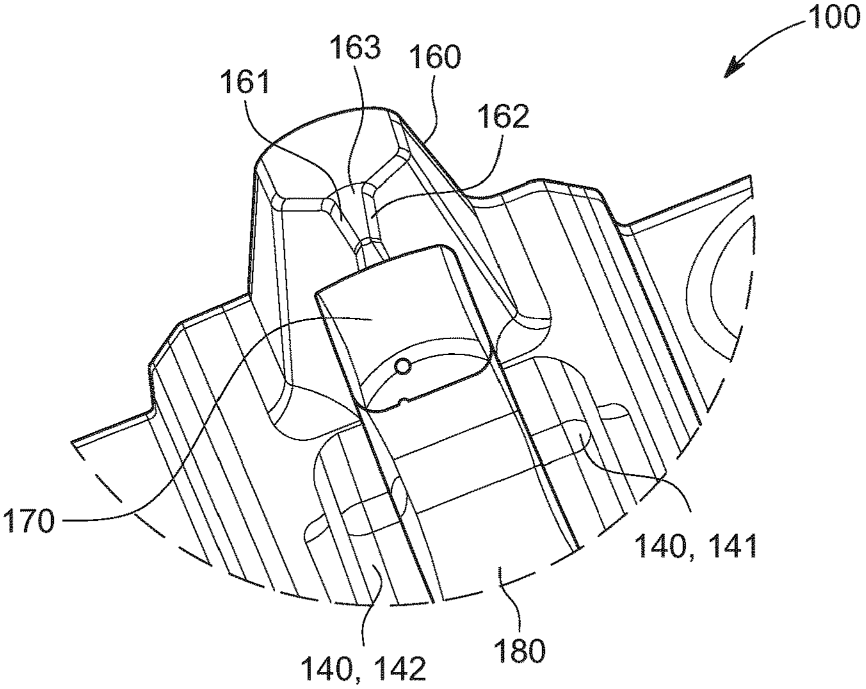
FIG. 2B shows detail of FIG. 2A.
Figure 3B:
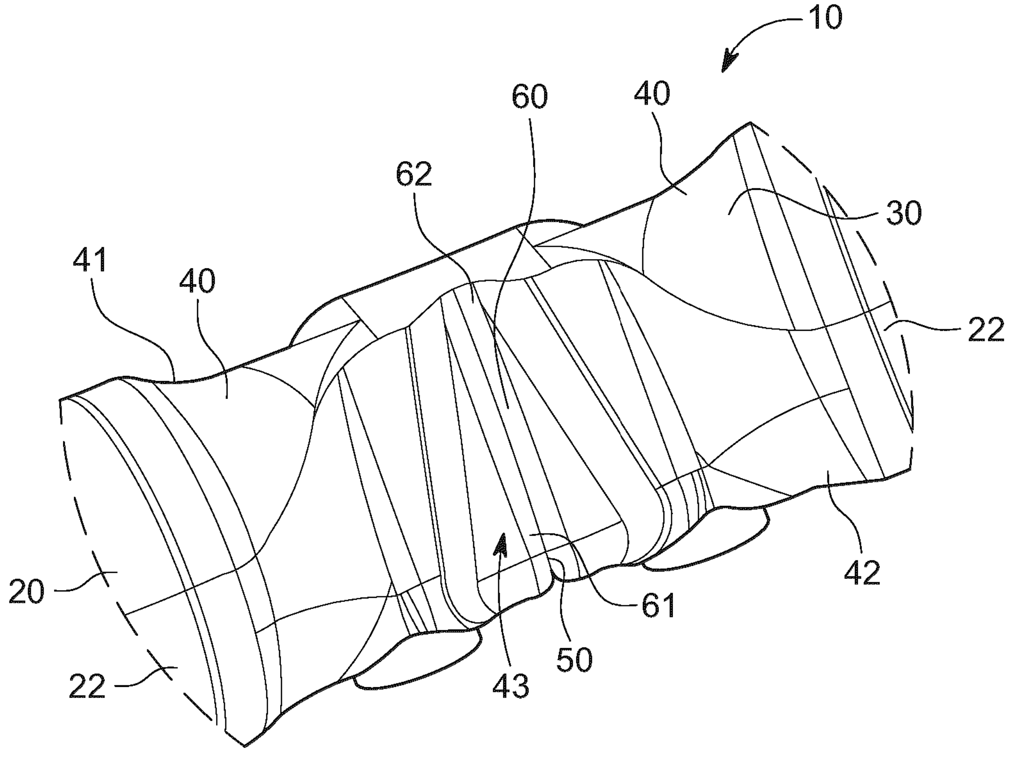
FIG. 3B shows detail of FIG. 3A.

FIG. 2B shows detail of the alignment jig 100, and FIG. 3B shows detail of an intermediary portion 40 and a weakening zone of the workpiece 10.

As shown in e.g. FIG. 4, the workpiece 10 may comprise two temporarily interconnected items, a first sub-part 20 and a second sub-part 30. The first toy sub-part 20 and the second sub-part 30 are temporarily interconnected by a middle part, intermediary portion 40.

Figure 8A:
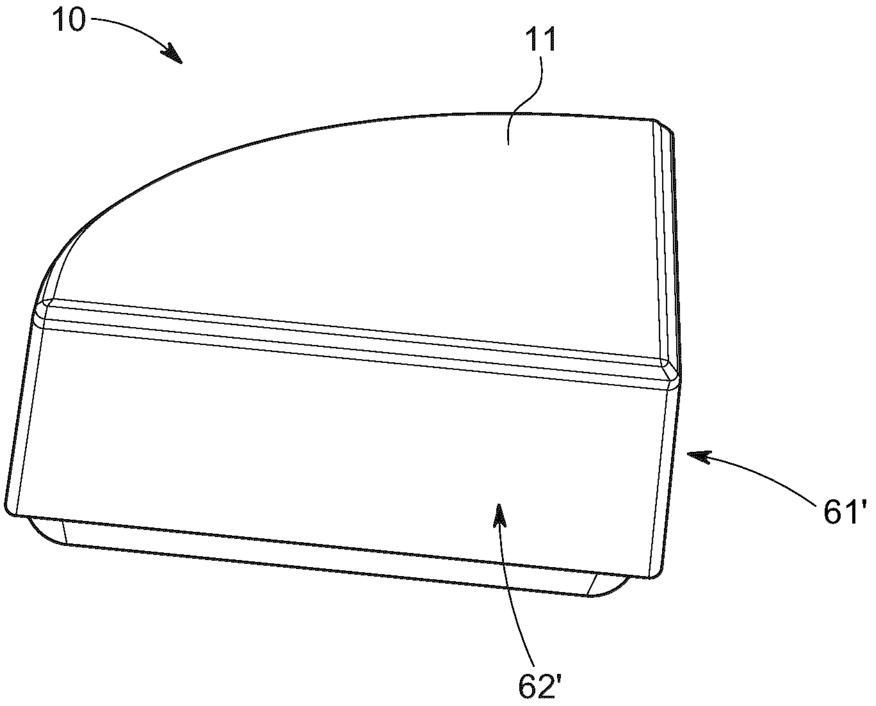
FIG. 8A, in a perspective view, shows another type of workpiece, than shown in FIGS. 1, 2A, 3A-B, 4, 5A-B, and 6, which workpiece may be held by an alignment jig for a holding system according to another embodiment than shown in FIGS. 1-7.
Figure 8B:
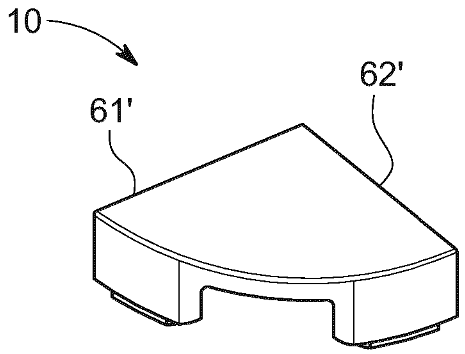
FIG. 8B, in a perspective view, shows the workpiece from a different angle than in FIG. 8A.

The first sub-part 20 and the second sub-part 30 of the workpiece 10, when separated from each other, may be assembled into or form parts of an assembly forming a toy, such as a toy figurine or a toy building element, when assembled. The workpiece 10 shown in the FIGS. 1, 2A, 3A-B, 45A-B and 6 resembles a left and right legs, i.e. the first sub-part 20 resembles a first leg 25, and the second sub-part 30 resembles a second leg 35 of such a toy figurine (not shown). The workpiece 10 shown in FIGS. 8A-B is of a different type resembling e.g. toy pie piece/slice or a toy building element such as a toy tile.

Retuning now to the workpiece 10 shown in the FIGS. 1, 2A, 3A-B, 45A-B and 6, attached to the first leg 25 is a first foot 26, and attached to the second leg 35 is a second foot 36.

The first sub-part 20 has a first end 21 and a second end 22. Likewise, the second sub-part 30 has a first end 31 and second end 32. The intermediary portion 40 is elongate and has a first end 41 and a second end 42. As illustrated in e.g. FIG. 4, the second end 21 of the first sub-part 20 is connected to the first end 41 of the intermediary portion 40. The second end 32 of the second sub-part 30 is connected to the second end 42 of the intermediary portion 40. The first foot 26 of the first leg 25 is connected to the first sub-part 20 at the fist end 21 thereof. The second foot 36 of the second leg 35 is connected to the second sub-part 30 at the first end 31 thereof.

The first sub-part 20, the second sub-part 30 and the intermediary portion 40 are formed together as a unitary structure, preferably in plastic, and preferably by moulding process such as an injection moulding process.

The workpiece 10 may be held by the alignment jig 100 during an after-treatment of the first sub-part 20 and the second sub-part 30. Such an after-treatment may for example be printing/placement of decorations, spray painting, or the like.

When the first sub-part 20 and the second sub-part 30 have been after treated, the first sub-part 20 and the second sub-part 30 may be separated from each other, and form parts of e.g. a toy, such as a toy figurine.

Preferably, the first sub-part 20 and the second sub-part 30 are identical or symmetrical items. Preferably, the first sub-part 20 and the second sub-part 30 are symmetrical about a centre plane.

The intermediary portion 40 is configured to allow a holding device, an alignment jig 100, to grab and hold the workpiece for and during the after-treatment (e.g. printing). The two sub-parts 20, 30 and the intermediary portion 40 are aligned along an axis. Holding the workpiece 10 at the intermediary portion 40 allows that the two sub parts 20, 30 are free to be after-treated.

The intermediary portion 40 has a first side 43, see e.g. FIGS. 3A, 3B and FIG. 4, and opposite thereto, a second side 44, see e.g. FIG. 2A.

The intermediary portion 40 may have a generally rectangular cross-section.

The intermediary portion 40 of the workpiece 10 and the alignment jig 100 are configured such that the workpiece 10 may be held by the alignment jig 100 during the after-treatment process by the first side 43 and the second side 44 being squeezed between a first jaw 160 and a second jaw 180 of the alignment jig 100.

The intermediary portion 40 further has a weakened zone 50 of reduced material thickness, see e.g. FIG. 3B.

When the after-treatment has been completed (using the holding system 1 and alignment jig 100), the two sub parts 20, 30 of the workpiece 10 may be separated, breaking them apart at the weakened zone 50.

As shown in FIG. 1, the weakened zone 50 is preferably provided centrally on the workpiece 10 and the intermediary portion 40, i.e. the distance, L1, from the extreme end of the first sub-part 20 to the single, central weakened zone 50, is identical to the distance L2, from the opposite, extreme end of the second sub-part 20 to the single, central weakened zone 50.

In this case, each of the two sub parts 10, 20 after breaking them apart at the weakened zone 50, will end of having a portion (half of the intermediary portion 40) attached to it.

In principle, in other (not shown) embodiments, there may be two weakened zones, so that the intermediary portion 40 (or at least a portion thereof) will not form part of the resulting items (e.g. legs 24, 26), when the workpiece 10 could then be separated into three parts.

The weakened zone 50 may be formed as an indent in at least a first side 43 of the intermediary portion 40 of the workpiece 10. This is illustrated in e.g. FIG. 3B.

In some embodiments, the intermediary portion 40 may further comprise a second indent 52 in the opposite second side 44 of the intermediary portion of the injection moulded workpiece, see FIG. 2A. The one or oppositely arranged indents 51, 52 provides a reduced material thickness, and thereby provides a weakened zone 50.

Preferably, and in order to allow an alignment jig 100 to grab and align a workpiece 10 between a first and a second jaw 160, 180 in a correct position lengthwise position thereof, the intermediary portion 40 of the workpiece 10 is provided with a first alignment surface 61 and a second alignment surface 62 provided on the intermediary portion 40 of the workpiece 40, where the first and second alignment surfaces 61, 62 are preferably angled relative to each other, and configured to cooperate with mating respective first and second alignment surfaces 161, 162 on one of the jaws 160, 180 of the alignment jig 100.

In the embodiments shown, the first and second alignment surfaces 161, 162 are provided on a first stationary jaw 160, which will be described in more detail below, in connection with the alignment jig 100.

Preferably, the two alignment surfaces 61, 62 of the intermediary portion 40 of the workpiece are formed as intersecting surfaces in a wedge shape. Preferably, the two alignment surfaces 61, 62 of the intermediary portion 40 are formed as an indention 60 into a side 43 of the intermediary portion 40. In this case, the cooperating alignment surfaces 161, 162 on the jaw 160, 180 of the alignment jig 100 is provided as a protruding wedge-shaped flange 163.

In preferred embodiments, and as shown in the figures, such an indention 60 may preferably be coinciding with the weakened zone 50, i.e. the indention 50 is the same as the indent 51 in first side of the intermediary portion 40 of the injection moulded workpiece 40.

However, in not shown embodiments, there may be both alignment surfaces 61, 62 and indents 51,52 in the sides 43, 44 of the intermediary portion 40.

Thus, an aspect of the disclosure relates to a workpiece 10 having profiled aligning surfaces 61, 62 configured for interacting with corresponding surfaces on a jaw of an alignment jig 100. This allows centering/alignment of the workpiece 10 in the alignment jig 100 for accurate after-treatment (e.g. printing). The interacting profiled 61, 62 alignment surfaces preferably forms a V-shape Also, an aspect of the disclosure relates to an alignment jig 100 having profiled aligning surfaces 161, 162 configured for interacting with corresponding surfaces 60 on a workpiece 10. This allows centering/alignment of the workpiece 10 in the alignment jig 100 for accurate after-treatment (e.g. printing). The interacting profiled alignment surfaces 161, 162 preferably forms a V-shape.

An alignment jig 100 according to the disclosure may comprise a set of jaws 160, 180 having opposed alignment surfaces 61, 62; 161, 162 as described above. The jaws 160, 180 may in principle both be fixed/stationary relative a base, e.g. a plate body 100' of the alignment jig 100, one or both of the jaws 160, 180 being provided with a resilience such that a workpiece 10 may be snapped in between the two jaws 160, 180.

However, in a further aspect, the disclosure relates to a holding device in the form of an alignment jig 100 having a fixed or stationary jaw 160 and a moveable jaw 180 configured for cooperating with two opposite side 43, 44 of an intermediary portion of a workpiece 10. The fixed jaw 160 has profiled alignment surfaces 161, 162 configured for interaction/cooperation with profiled alignment surfaces 61, 62 on the workpiece 10. This allows the moveable jaw 180 to push the matching profiled alignment surfaces 61, 62 on the workpiece 10 into contact with each other to actively longitudinally align the workpiece during insertion of the workpiece, and allows for easy release of the workpiece after the after-treatment (printing).

Such an alignment jig 100 is shown in FIGS. 1, 2A, 2B, 3A, 3B, 5A, 5B, and 6. The alignment jig 100 may comprise a base. e.g. a plate body 100'. The plate body 100' has a first end 101 and a second end 102.

Figure 5A:
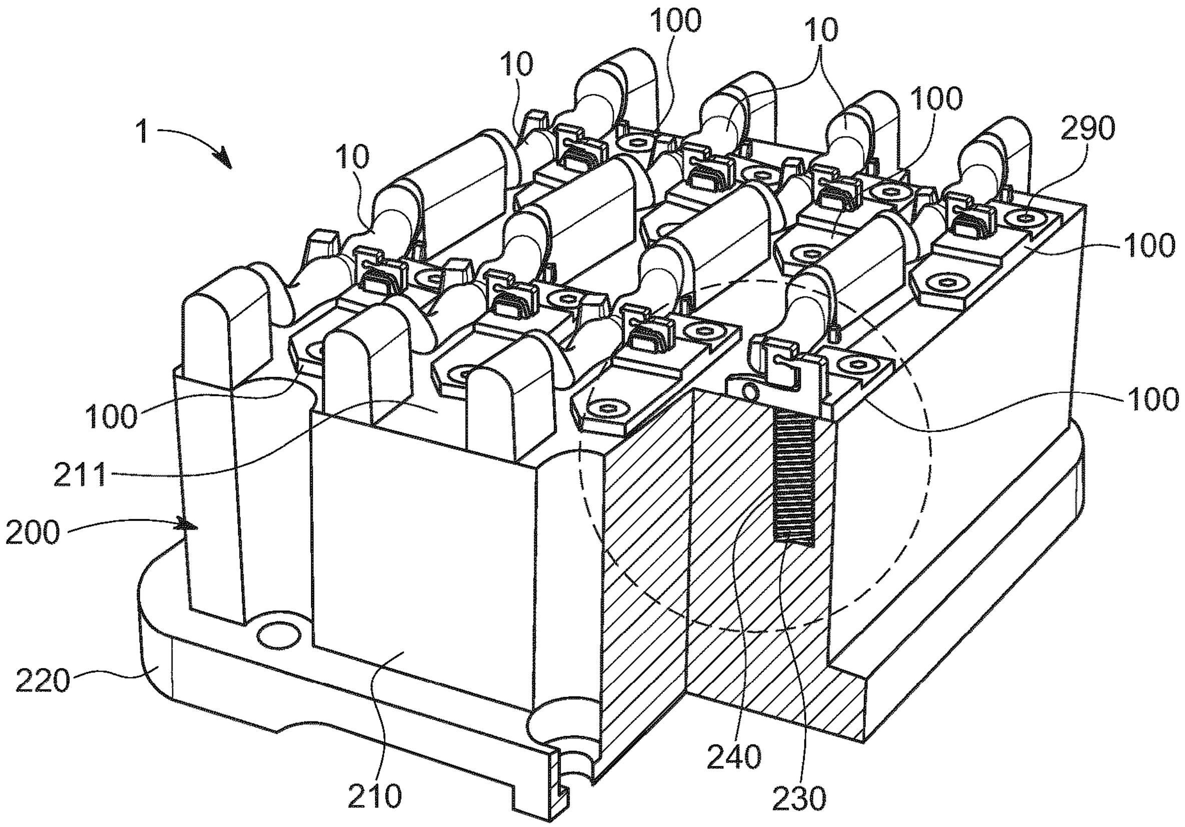
FIG. 5A, in a perspective view, shows an embodiment of the holding system having a main jig comprising a plurality of alignment jigs for holding and aligning a workpiece according.
Figure 5B:
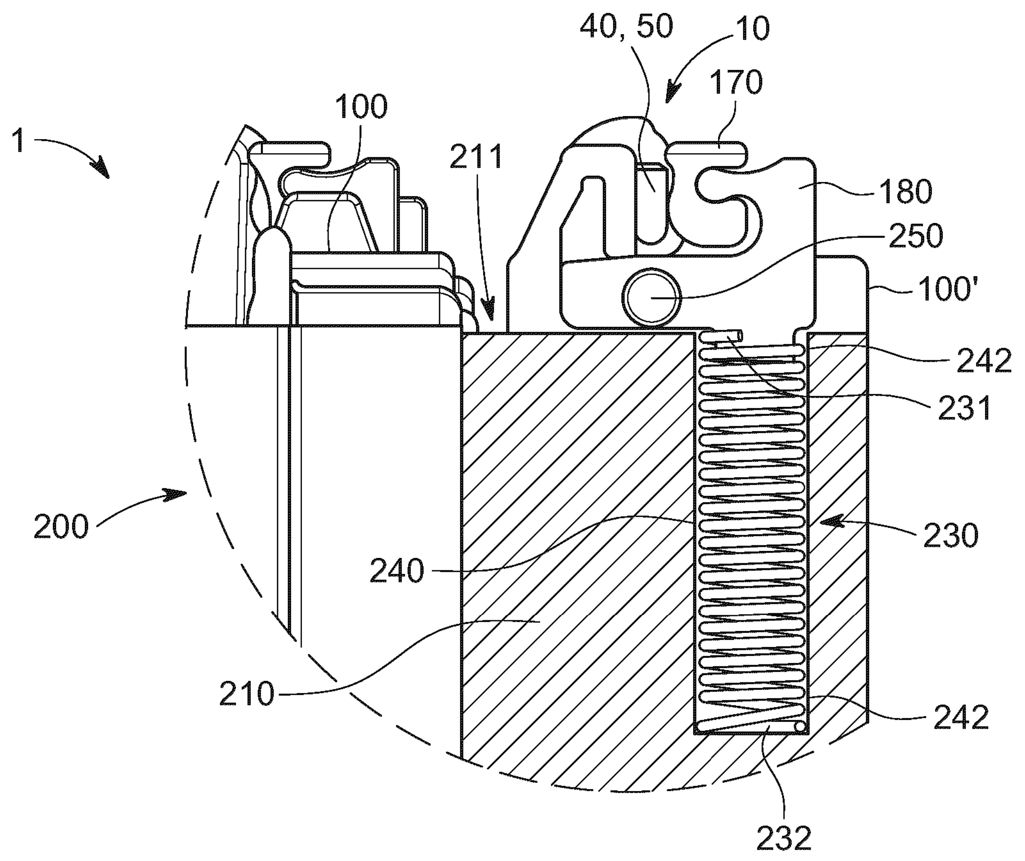
FIG. 5B shows detail of FIG. 5A.

The alignment jig 100 may comprise attachment means, such as one or more holes 190 configured for attaching the alignment jig to a robot arm or a main jig 200 suitable for mounting a plurality of alignment jigs 100. An example of the latter is shown in FIGS. 5A and 5B, and described in more detail below.

Preferably, but optionally, the alignment jig 100 may comprises a first workpiece support 110 at the first end 101 of the plate body 100' of the alignment jig 100. The first workpiece support 110 may provide support for the workpiece during engagement of the workpiece 10 and/or during the after-treatment process. The first workpiece support 110 may especially provide support against movement in a direction perpendicular to a longitudinal direction of the workpiece 10. The first workpiece support 110, may as shown in e.g. FIG. 1 comprise a first arm 111 and a second arm 112 where in between a portion of the workpiece may rest.

Correspondingly, the alignment jig 100 may comprises a second workpiece support 120 at the second end 102 of the plate body 100' of the alignment jig 100. The second workpiece support 120 may provide support for the workpiece during engagement of the workpiece 10 and/or during the after-treatment process. The second workpiece support 120 may especially provide support against movement in a direction perpendicular to a longitudinal direction of the workpiece 10. The second workpiece support 120, may as shown in e.g. FIG. 1 comprise a first arm 121 and a second arm 122 where in between a portion of the workpiece may rest.

In some embodiments the alignment jig comprises both a first workpiece support at the first end of the alignment jig 100 and a second workpiece support 120 at the second end 102 of the alignment jig 100. This may counteract torsional forces in a plane parallel to a plane defined by the plate body 100' of the alignment jig 100.

An elevated plateau 130 may extend above the plate body 100' of alignment jig 100, at least at a central portion thereof.

A first jaw 160 may protrude upwards from the plate body 100' of alignment jig 100, or from the elevated plateau 130.

The first jaw 160 is preferably and as shown in the figures fixed/stationary relative to the plate body 100' of alignment jig 100. The first jaw 160 has a front surface facing towards a second jaw 180. The first jaw 160 further comprises a flange 163 protruding from the front surface towards the second jaw 180. The flange has a triangular or wedge-shaped cross-section. Thus two surfaces, first alignment surface 161 and second alignment surface 162 forming a V-shape relative to each other.

When, a workpiece 10 having a depression 60 with two corresponding alignment surfaces 61, 62 is pressed against the flange 163 of the first jaw (by the second jaw 180) the workpiece will align in the lengthwise direction.

Opposite to the first jaw 160 a second jaw is arranged. The second jaw 180 is movable relative to the plate body 100' and to the first jaw 160 of the alignment jig 100. The second jaw 180 is movable in the direction of the arrow 302 (and 1800 thereto) in FIG. 6 to provide a pressure on a workpiece 10 inserted between the first and second jaw 160, 180, and towards the fixed/stationary first jaw 160. The second jaw 180 is also moveable away from the first jaw 160, such that the workpiece may be released from the grip of the first and second jaws 160, 180, once the after-treatment has been completed.

This allows the moveable second jaw 180 to push the matching profiled alignment surfaces 61, 62 on the workpiece 10 and the profiled alignment surfaces 161, 162 on the first jaw 160 into contact with each other to actively longitudinally align the workpiece 10 during insertion of the workpiece, and allows for easy release of the workpiece after the after-treatment (e.g. printing).

The second jaw 180 has a front surface, such as first abutment surface 171, for abutment against a surface of the workpiece 10. The first abutment surface 171 may be provided on head portion 170 attached to second jaw as described below or directly on the second jaw (not shown). Correspondingly, the workpiece 10 may comprise an abutment surface 70 on the second side 144 of intermediary portion 40 of the workpiece 10.

Figure 6:
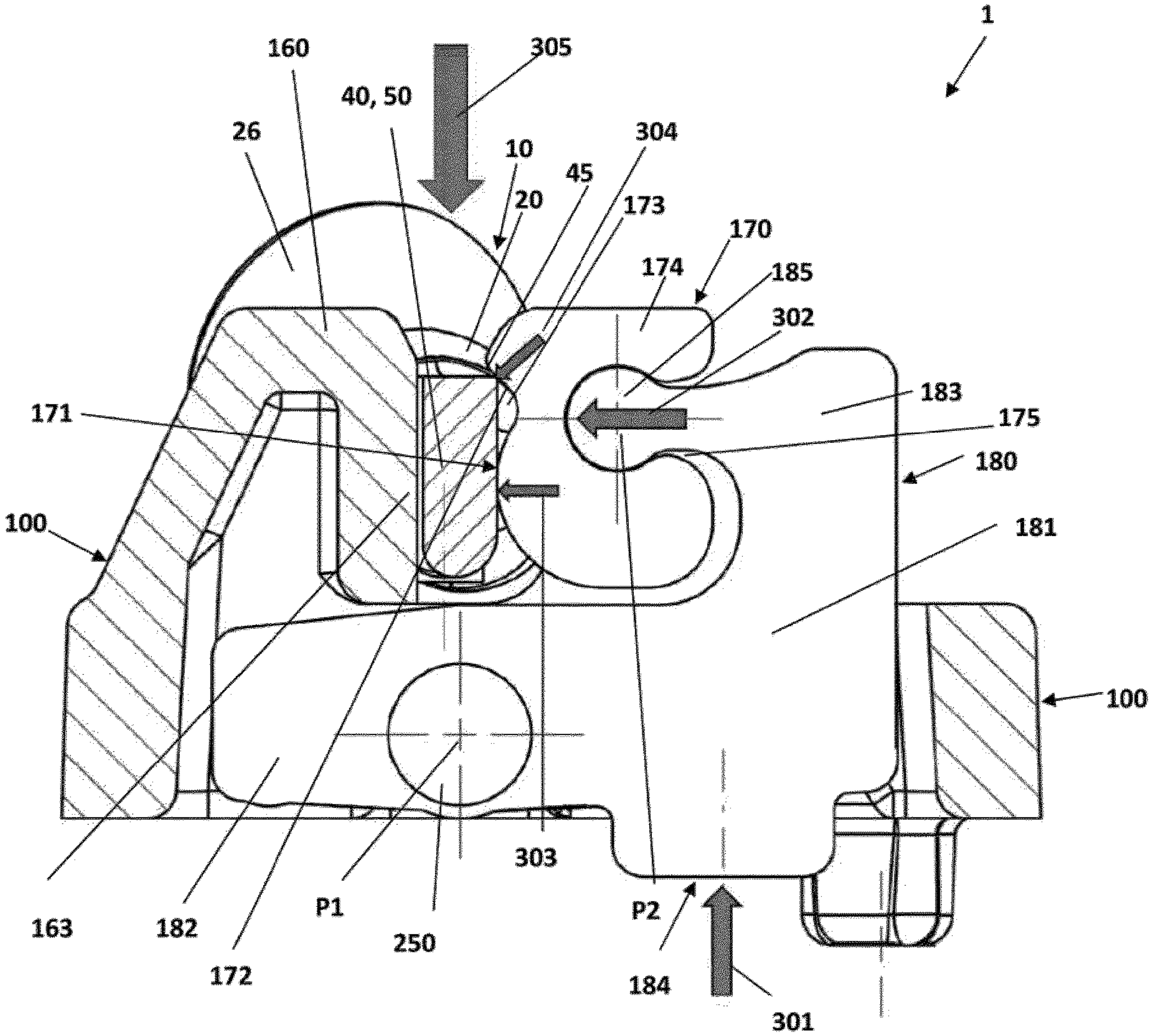
FIG. 6, in a side sectional view, shows detail of an alignment with a workpiece inserted therein.
Figure 7A:
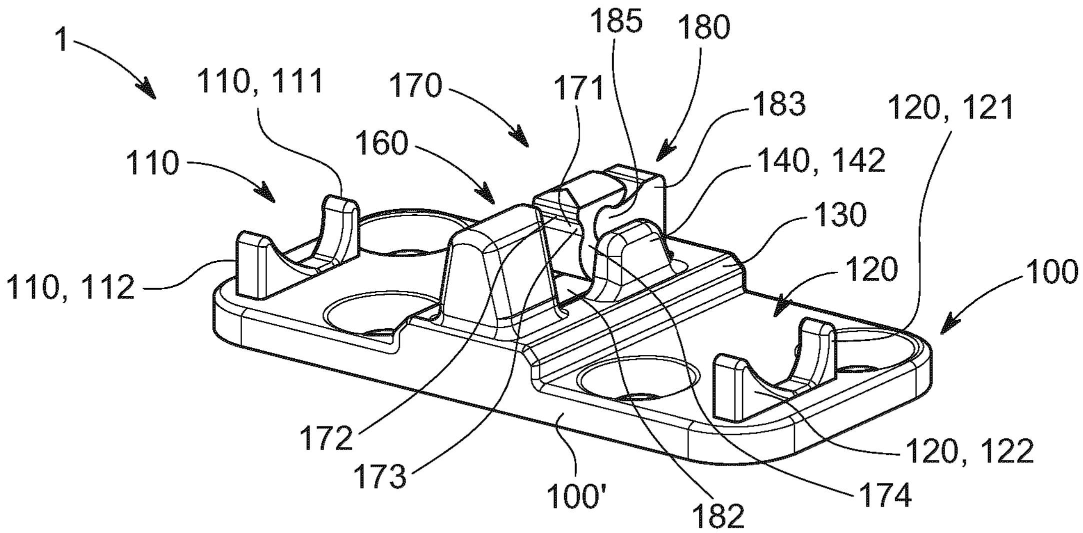
FIG. 7A, in a perspective view, shows the alignment jig of FIGS. 1, 2A-B, 3, 5A-B, and 6 from a different angle.
Figure 7B:
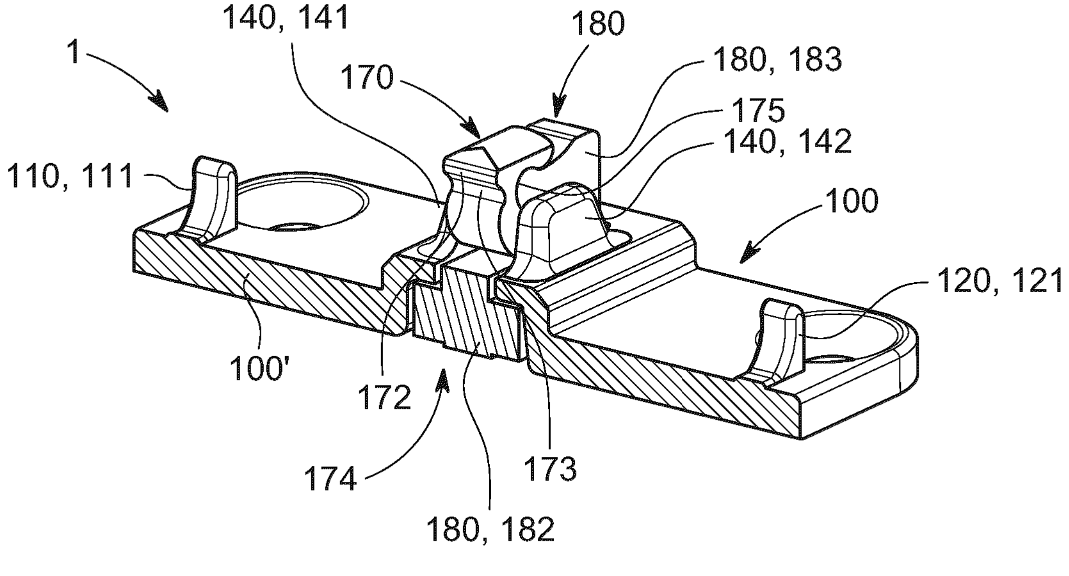
FIG. 7B, in a perspective view, shows a vertical section through the alignment jig of FIG. 7A, the section taken in a longitudinal direction from a first end of the alignment jig to a second end of the alignment jig.
Figure 7C:
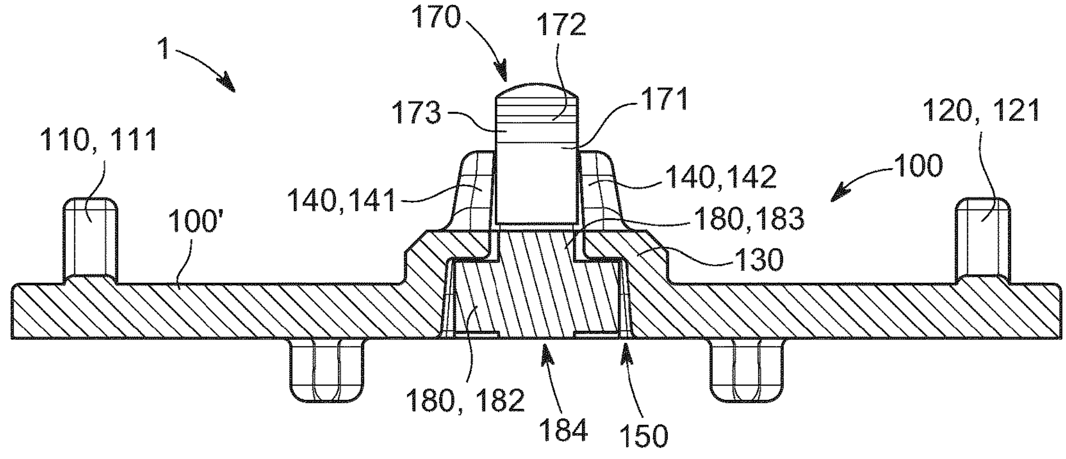
FIG. 7C, in a frontal view shows the same section as in FIG. 7B.
Figure 7D:
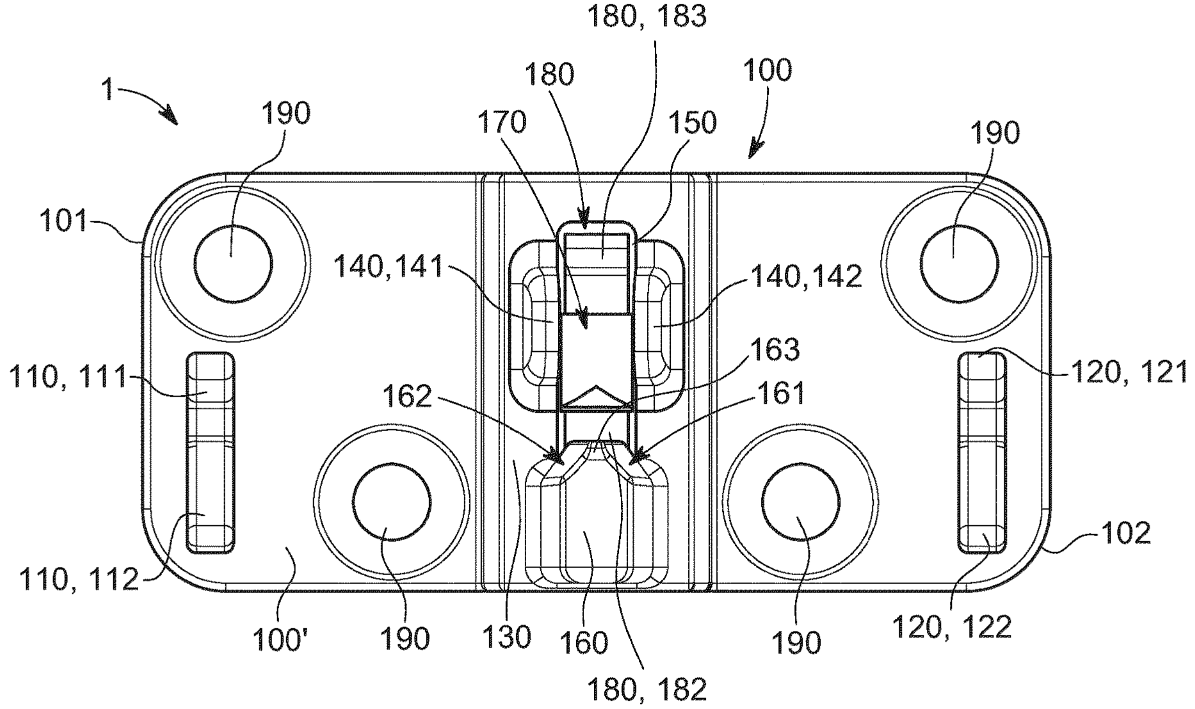
FIG. 7D, in a top view, shows the alignment jig of FIG. 7A.

In a further aspect, the moveable second jaw 180 may be shaped with two contact surfaces, an upper contact surface and a lower contact surface. The lower contact surface or first abutment surface 171 is configured to push the workpiece 10 against the fixed/stationary first jaw 160 (in the direction of the arrow 302, shown in FIG. 6. The arrow 303 in FIG. 6 shows this push against the workpiece 10. The upper contact surface or second abutment surface 172 of the second jaw is configured for pushing the workpiece 10 "downward"/against body plate 100 of the alignment jig 100, thereby aiding vertical alignment of the workpiece for the after-treatment, and securing the workpiece 10 from slipping out of the jaws hold during the after treatment. Arrow 304 in FIG. 6 represents a downward directed force component by the second abutment surface 172 of the holding head 170 on the workpiece 10 (when pressed into alignment jig 100, as indicated by arrow 305). As also described in connection with previously mentioned aspects and embodiments, the first abutment surface 171 and the second abutment surface 172 may be provided on a head portion 170 attached to second jaw 180, which will be described below, or directly on the second jaw (not shown).

As mentioned above, the contact surfaces, the first and second abutment surfaces 171, 172 on the movable jaw 180 may preferably and as illustrated in FIG. 6 be arranged on a head portion 170, forming a separate attachable part relative to the main part, body 181 of the second jaw 180. Preferably, the head portion 170 is pivotal relative to the main jaw body 181. Thereby, the head portion 170 may act as a force turning unit. This allows a more precise and stable grabbing of the workpiece.

As shown in FIG. 6, the head portion 170 is pivotally connected to the body 181 of the second jaw 180 by a protruding knob 185 protruding in the horizontal direction from a portion of the body 181 of the second jaw 180, and cooperating with a cavity formed in a body of the head portion 170, which cavity 175 is configured for receiving the protruding knob of the second jaw 180. The protruding knob 185 and the corresponding cavity 175 allow a slight rotation between the head 170 and the second jaw body 181, second pivot P2.

The head portion or holding head 170 may be held in position sideways by a side support 140, The side support 140 may comprise a first side flange 141 of one side of the second jaw 180 and holding head 170, and a second side flange 142 on the other side of the second jaw 150 and holding head 170.

The second jaw 180 is preferably pivotally connected to the alignment jig 100 via an axle 250 in a first pivot P1. This allows the second jaw 180 to act as a "force turning unit" to translate a force of, e.g. a vertically arranged spring 230 into a sideways/rotational force of the movable second jaw 180. This, will be explained in further detail in connection with FIGS. 5A-B. However, it will be realized that spring loading the second jaw 180 by a vertically arranged spring 230 will save space in the horizontal direction and thereby allow a close bundling of a plurality of alignment jigs 100 side by side.

Preferably, the plate body 100' of the alignment jig 100 is provided with a through-going opening 150, through the plate body 100' this allows to lower the first pivot P1.

The second jaw 180 is preferably provided partly in the opening 150.

The body 181 of the second jaw 180 comprises a horizontal portion 182 provided in the opening 150 through the plate body 100' The body 181 of the second jaw 180 further comprises a vertical portion 183 formed as an integral part of the body 181, and perpendicular to the horizontal portion 182. The vertical portion 183 extends from and above the through-going opening 150 through the plate body 100'. The above mentioned protruding knob 185 extends from the vertical portion 183 in the horizontal direction, perpendicular to the direction of the vertical portion 183, from an upper portion thereof.

The body 181 of the second jaw 180 further may comprise a spring abutment surface 184 for abutment against a spring 230 for spring loading the second jaw 180. The spring abutment surface 184 is provided on a lower/downwardly facing surface of the body spring 181 of the second jaw 180 below the vertical portion 183.

As illustrated in FIGS. 5A-B a plurality of alignment jigs 100 as described above may be grouped together on a main jig 200. In FIG. 5A a grid of 2×4 alignment jigs 100 has been provided. It will be appreciated that a main jig 200 may comprise fewer or more alignment jigs 100 arranged in a grid structure.

Arranging the alignment jigs 100 in a grid allows the simultaneous after treatment of multiple workpieces at the same time.

The main jig 100 may as shown in FIG. 5A comprise a block/main body 210 having an upper surface 211 on which the alignment jigs 100 may be attached using suitable attachment means. For instance, threaded holes (not shown) may be provided in the block/main body 210 to which bolts 290 may be secured through the above mentioned holes 190 in the alignment jigs 100.

Opposite to the upper surface 211 of the main jig 200, the main jig 200 may comprise a mounting flange 220 configured to connect the main jig 200 to a robot arm or other machinery suitable for bring the workpieces 10 held by the alignment jigs 100 into contact with the machinery performing a desired after-treatment to the workpieces.

For each alignment jig 100 arranged on the main jig 200, a spring 230 may be arrange in separate bores provided from the upper surface 211 of the main jig 200 and into the block/main body 210 vertically (perpendicular to a plane defined by the upper surface 211).

The spring 230 may be inserted through an opening 241 into the bore 240 from the upper surface of block/main body 210 of the main jig 200 The spring has a first end 231 and a second end 232 and length adapted to a length of the bore 240 such that the spring 230 provides a loading of the second jaw 180, when the first end of the spring 230 abuts on the spring abutment surface of the second jaw 180 and the second end 232 of the spring 230 abuts against a bottom 242 of the bore 240, see FIG. 5B.

FIGS. 8A-B shows a workpiece 10 having a different shape than the workpiece described above, i.e. a different type of workpiece 10. The workpiece 10 shown in FIGS. 8A-B is of a type resembling e.g. toy pie piece/slice or a toy building element such as a toy tile. This is representative of a type of the workpiece 10 having a wedge shape or having a portion of which is wedge shaped, or having a wedged shaped alignment surfaces formed in or on the workpiece 10.

In any case, the workpiece 10, shown in FIGS. 8A-B comprises a first alignment surface 61' and a second alignment surface 62' adjacent to and angled respective to the first alignment surface 62', Thus, the workpiece 10 shown describes a general wedge shape. It will be appreciated that in this case, the wedge shape protrudes from the body II of the workpiece 10 in contrary to the embodiments described above in connection with FIGS. 1-7 where the corresponding first alignment surface 61 and second alignment surface 62 were formed as a wedge shape indent into a body portion (the intermediary portion 40) of the workpiece 10.

Figure 9:
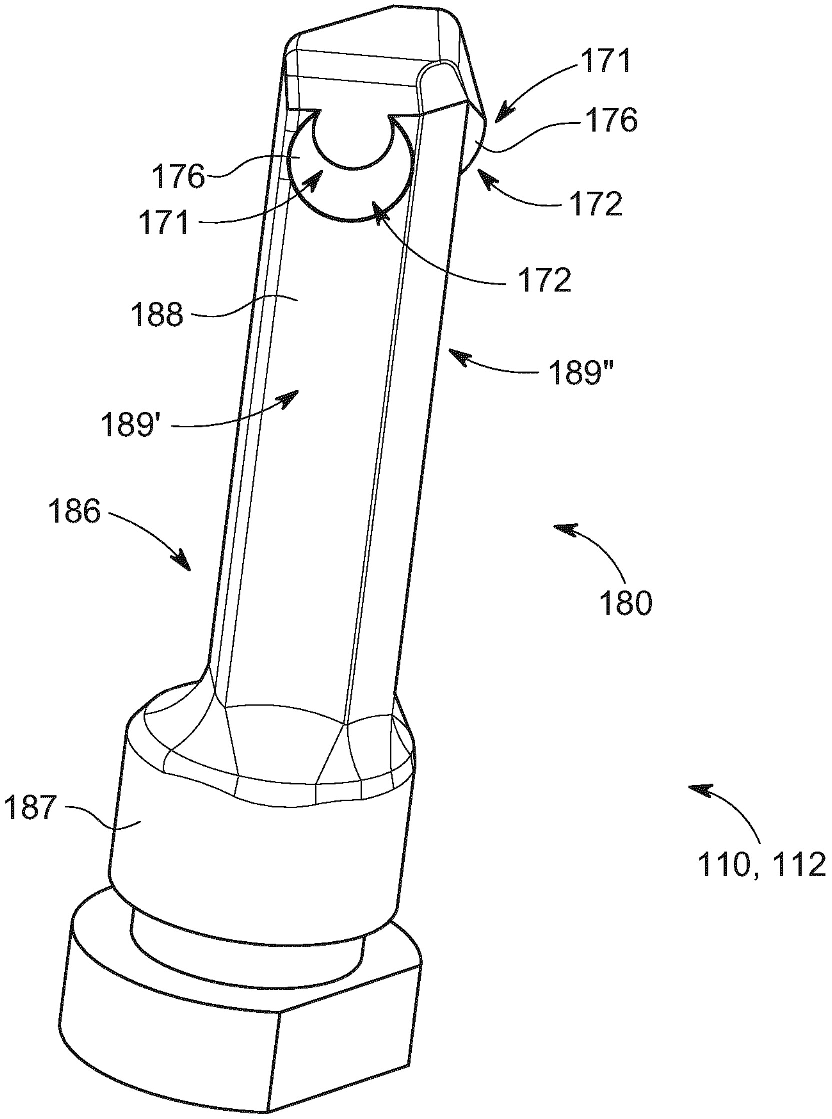
FIG. 9, in a perspective view, shows a second jaw for an alignment jig for a holding system for holding a workpiece according to another embodiment than shown in FIGS. 1-7.

In the following, and associating to FIGS. 9-11, is described an alignment jig 100 and a holding system 1 configured for holding and aligning a workpiece 10 of the type exemplified in FIGS. 8A-B during after-treatment of the workpiece 10.

Figure 10A:
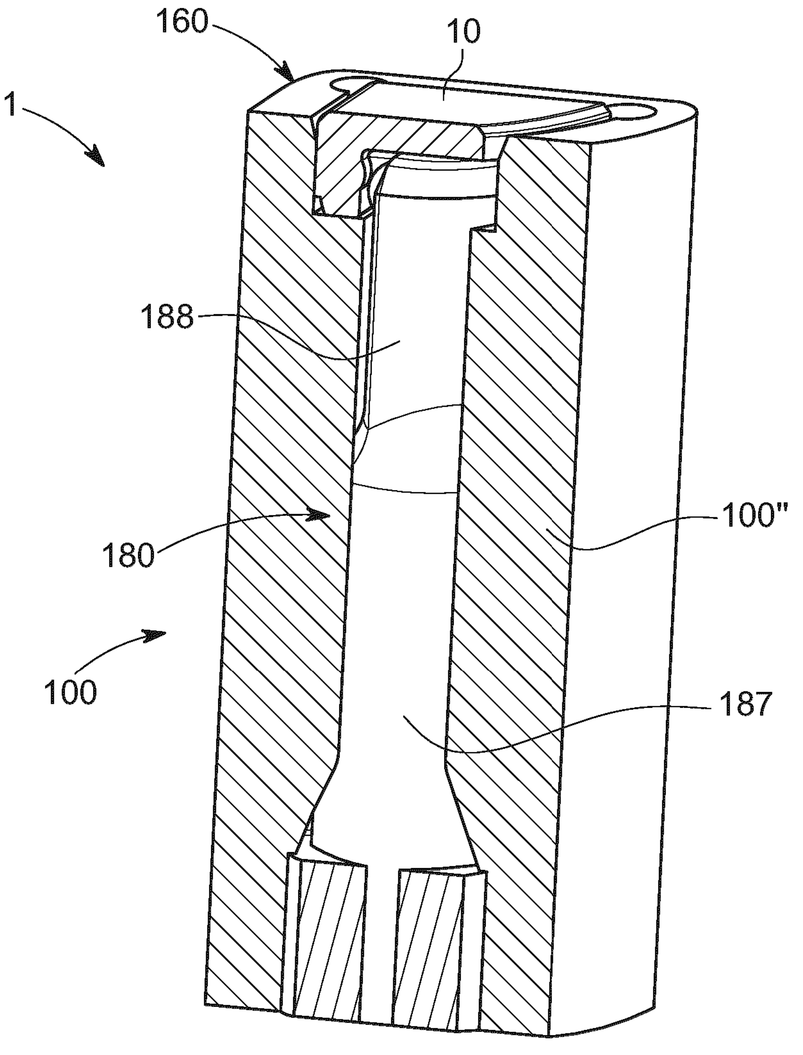
FIG. 10A, in perspective view, shows a vertical section through a portion of an alignment jig of a holding system and comprising a second jaw as shown in FIG. 9.

FIG. 10A, in perspective view, shows a vertical section through a portion of an alignment jig 100 of a holding system 1 according to this aspect of the disclosure. FIG. 10A further shows a pie-piece shaped workpiece 10 as shown in FIGS. 8A-B arranged in therein. In FIG. 10A, the workpiece 10 is also shown in section, i.e. the same section as the alignment jig 100.

Figure 10B:
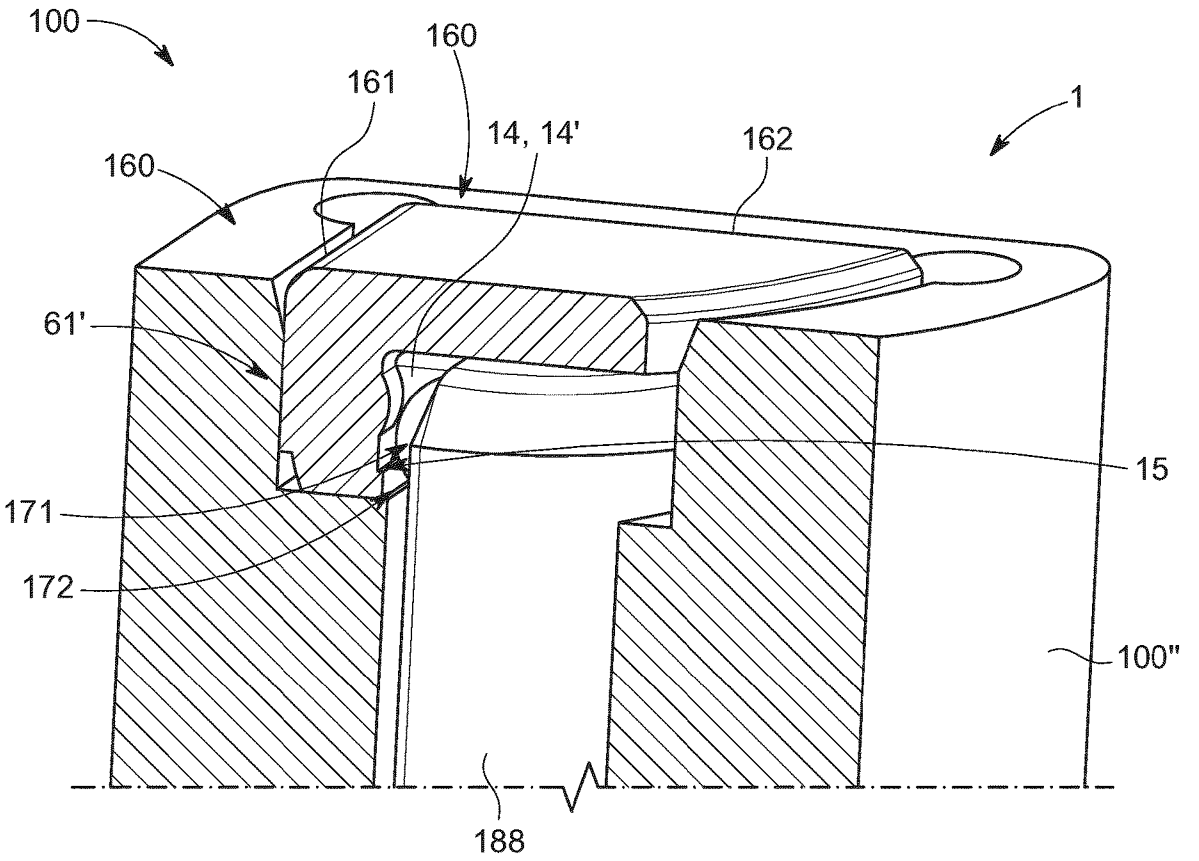
FIG. 10B shows a detail of an upper portion of the alignment jig of FIG. 10A.
Figure 10C:
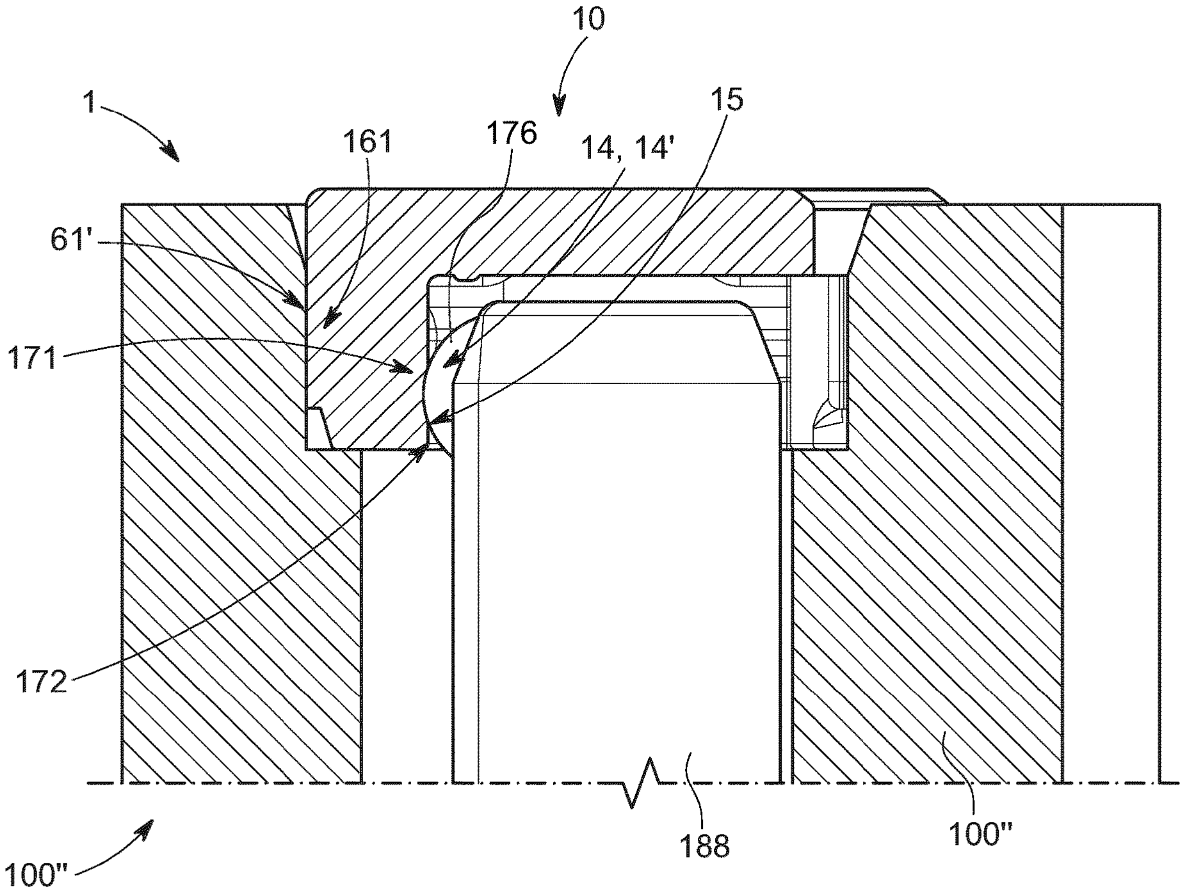
FIG. 10C, in a side view, shows the same detail of the alignment jig of FIG. 10A, as FIG. 10B.

FIG. 10B, also in a perspective view, shows details of an upper portion of the alignment jig 100 of FIG. 10A, and FIG. 10C, in a side view, shows the same detail of the alignment jig of FIG. 10A, as FIG. 10B.

Figure 11A:
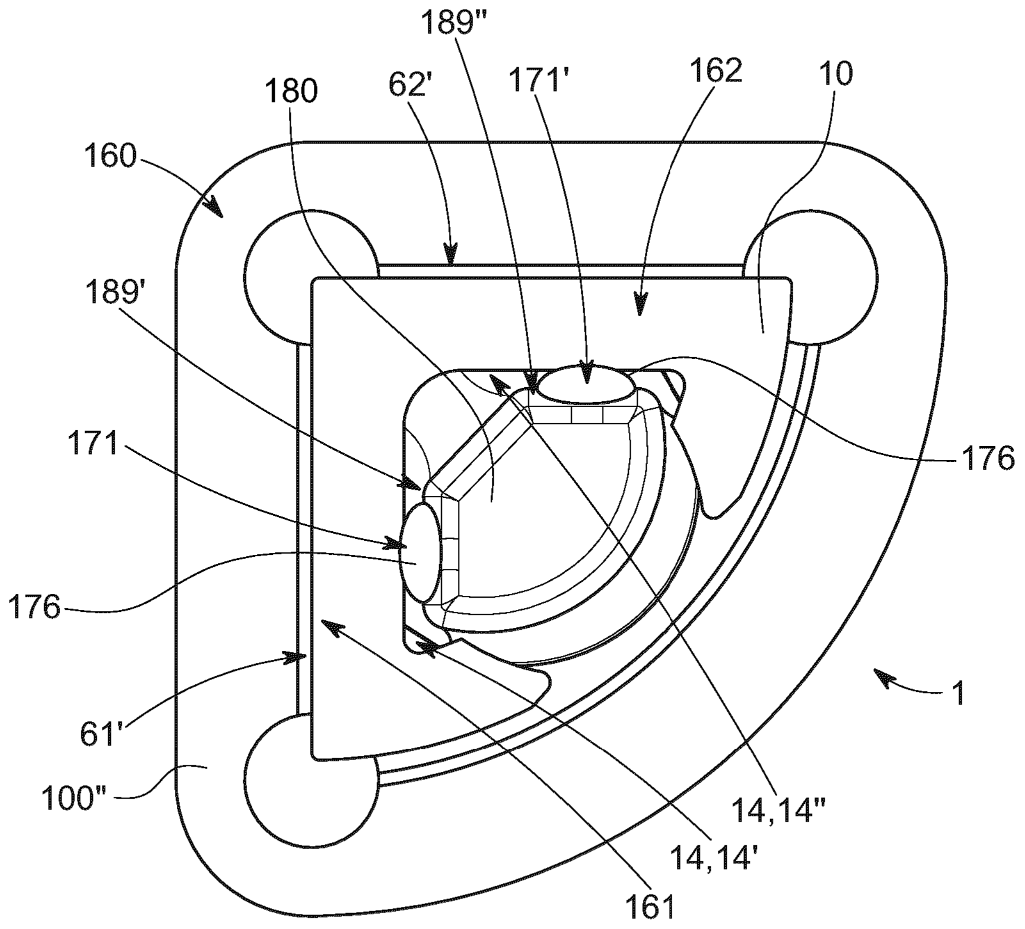
FIG. 11A, in top view, shows an alignment jig of a holding system, and with a workpiece as shown in FIGS. 8A-B held in the alignment jig, and where the workpiece is represented as horizontal vertical section through the workpiece.

FIG. 11A, in top view, shows an alignment jig 100 of the holding system 1 with a workpiece 10 as shown in FIGS. 8A-B held in the alignment jig 100. The workpiece 10 is represented by a horizontal vertical section through the workpiece 10; and FIG. 11B, in a perspective view, shows the alignment jig of FIG. 11A The alignment jig 100 in these embodiments comprises a main body 100", corresponding to the plate body 100' described in connection with FIGS. 1-7 above. However, in this case, the main body 100" may as shown be elongate in the vertical direction. Similar to the embodiments described in connection with FIGS. 1-7 above, the main body 100" comprises a portion which functions as a first jaw 160.

The first jaw 160 in the shown embodiment of FIGS. 10-11 is formed as a part of an opening extending into an upper surface of the main body 100" of the alignment jig 100, which opening is sized and shaped to receive the shape of the workpiece 10.

The first jaw 160 comprises a first alignment surface 161 configured for engaging the first alignment surface 61' of the workpiece 10, and a second alignment surface 162 configured for engaging the second alignment surface 62' of the workpiece 10. In this case, the first alignment surface 161 and the second alignment surface 162 are formed as inner surfaces or walls of the opening into the upper surface of the main body 100" of the alignment jig 100.

The first alignment surface 161 and the second alignment surface 162 formed as inner surfaces or walls of the opening into the upper surface of the main body 100" of the alignment jig 100 are—as shown preferably formed vertically, i.e. perpendicular to the upper surface of the main body 100" of the alignment jig 100.

It will be appreciated from FIGS. 10A-B and 11A-B that the opening into the upper surface of the alignment jig 100 for receiving the workpiece also has a "back wall" corresponding to the rounded/arc shaped "back surface" of the pie-piece shaped workpiece 10. As may be appreciated from FIGS. 11A-B, this back wall does not engage with rounded/arc shaped "back surface" of the pie-piece shaped workpiece 10, and nay in other—not shown—embodiments be omitted.

As is the case with the embodiments described in connection with FIGS. 1-7, the alignment jig 100 of FIGS. 10A, 10B, 10C, 11A, 11B also comprises a second jaw 180.

As is the case with the embodiments described in connection with FIGS. 1-7, and as will be described in further detail below, the alignment jig 100 of FIGS. 10A, 10B, 10C, 11A, 11B therefore also comprises a set of jaws configured to grab and hold the workpiece 10 between a first jaw 160 and a second jaw 180 of the set of jaws.

As is the case with the embodiments described in connection with FIGS. 1-7, and as will be described in further detail below, the second jaw 180 of the alignment jig 100 of FIGS. 10A, 10B, 10C, 11A, 118 is movably arranged relative to the first jaw 160.

An embodiment of the second jaw 180 of the alignment jig 100 of FIGS. 10A, 10B, 10C, 11A, 11B is shown in more detail in FIG. 9.

The second jaw 180 comprises an elongate body 186 comprising a base 187 and a rod 188. The base 187 is fixedly connectable to the alignment jig 100. As shown in FIGS. 10*a*, 10B, 10C, the base 187 may be connected to a bore through the main body 100" of the alignment jig 100.

The rod 188 is connected to and extends from the base 187.

It will be appreciated that the rod 188 of the elongate body 186, is arranged in a bore portion of the main body 100" of the alignment jig 100, which bore portion has a larger diameter than the outer diameter of the rod 188. Therefore, the rod 188 of the elongate body 186 of the second jaw 180 is allowed to bend relative to the base 187 of the elongate body 186 of the second jaw 180, if a sideways pressure is applied to an upper portion (which is defined opposite to the base 187) of the rod 188, and to swing back to its original position, when the pressure is removed from the upper portion of the rod 188. Thereby, at least the upper portion of the rod 188 is movably arranged relative to the alignment jig as such.

At least the rod 188 may be formed in an elastically resilient material. However, in preferred embodiments the entire elongate body 186 of the second jaw 180 may be formed in the same material.

The elastic resilient properties of the material of the rod are preferably configured such that the rod is allowed to bend relative to the base of the elongate body of the second jaw, if a sideways pressure is applied to an upper portion of the rod and swing back to its original position, when the pressure is removed from the upper portion of the rod. Thereby, at least the upper portion of the rod is movably arranged relative to the alignment jig as such. And thereby, if a suitably configured workpiece 10 is pressed between the first and the second jaw 160, 180 of the alignment jig 100, at least the upper portion of the rod 188 is bent away from its rest position and will create a bias towards it's rest position (and the first jaw 160) on a portion of the workpiece 10. This is utilized to provide a bias on the workpiece 10 and force the first and second alignment surfaces 61', 62' of the workpiece 10 towards the first and second alignment surfaces 161, 162 of the first jaw 160 of the alignment jig 10.

As is the case with the embodiments described in connection with FIGS. 1-7, and as will be described in further detail below, the second jaw 180 of the alignment jig 100 of FIGS. 10A, 10B, 10C, 11A, 11B comprises a first abutment surface 171. The first abutment surface 171 is vertically arranged, and is configured for engaging a second side surface 14 of the workpiece 10.

As shown in FIGS. 9, 10A, 10B, 10C, 11A, 11B, the first abutment surface 171 is preferably formed on a hemispherical bulge 176 formed on a surface 189' of the rod 188 of the elongate body 186 of the second jaw 180.

As is the case with the embodiments described in connection with FIGS. 1-7, and as will be described in further detail below, the second jaw 180 of the alignment jig 100 of FIGS. 10A, 10B, 10C, 11A, 11B comprises a second abutment surface 172.

As shown in FIGS. 9, 10A, 10B, 10C, 11A, 11B, the second abutment surface 172 is preferably formed on the hemispherical bulge 176 formed on a surface 189' of the rod 188 of the elongate body 186 of the second jaw 180.

The second abutment surface 172 faces downwards, at least partially, and is configure for engaging an upwardly facing surface 15 formed on the workpiece 10.

The upwardly facing surface 15 formed on the workpiece 10 may is visible in at least FIG. 10B, where the upwardly facing surface 15 is formed as a ledge on an inwardly facing surface of the workpiece 10 opposite the first alignment surface 161 if the workpiece 10.

As was also the case with the embodiments described in connection with FIGS. 1-7, the first abutment surface 172 on the second jaw 180, thereby is configured to press the first and second alignment surfaces 61', 62' of the workpiece 10 against the first and second alignment surfaces 161, 162 of the first jaw, respectfully, and thereby align the workpiece 10 correctly in the alignment jig 100.

As was also the case with the embodiments described in connection with FIGS. 1-7, the second abutment surface 172 on the second jaw 180 thereby is configured to hold the workpiece 10 down in the alignment jig 100.

As was also the case with the embodiments described in connection with FIGS. 1-7, the biased movement of the second jaw 180 relative to the first jaw 160 allows a workpiece of suitable size and shape to be snapped into hold between the first and second jaws 160, 180.

It is noted that the first jaw 160 is arranged adjacent to the second jaw 180.

It is further noted that the first jaw 160 and the second jaw 180, are arranged such that—when the second jaw 180 is in a rest position—a distance between the first and/or second alignment surfaces 161, 162 of the first jaw, and the first abutment surface 171 of the second jaw 180 is smaller than a distance between the first and/or second alignment surfaces 61', 62' of the workpiece 10 and the second surface 14, 14', 14" of the workpiece 10.

Figure 11B:
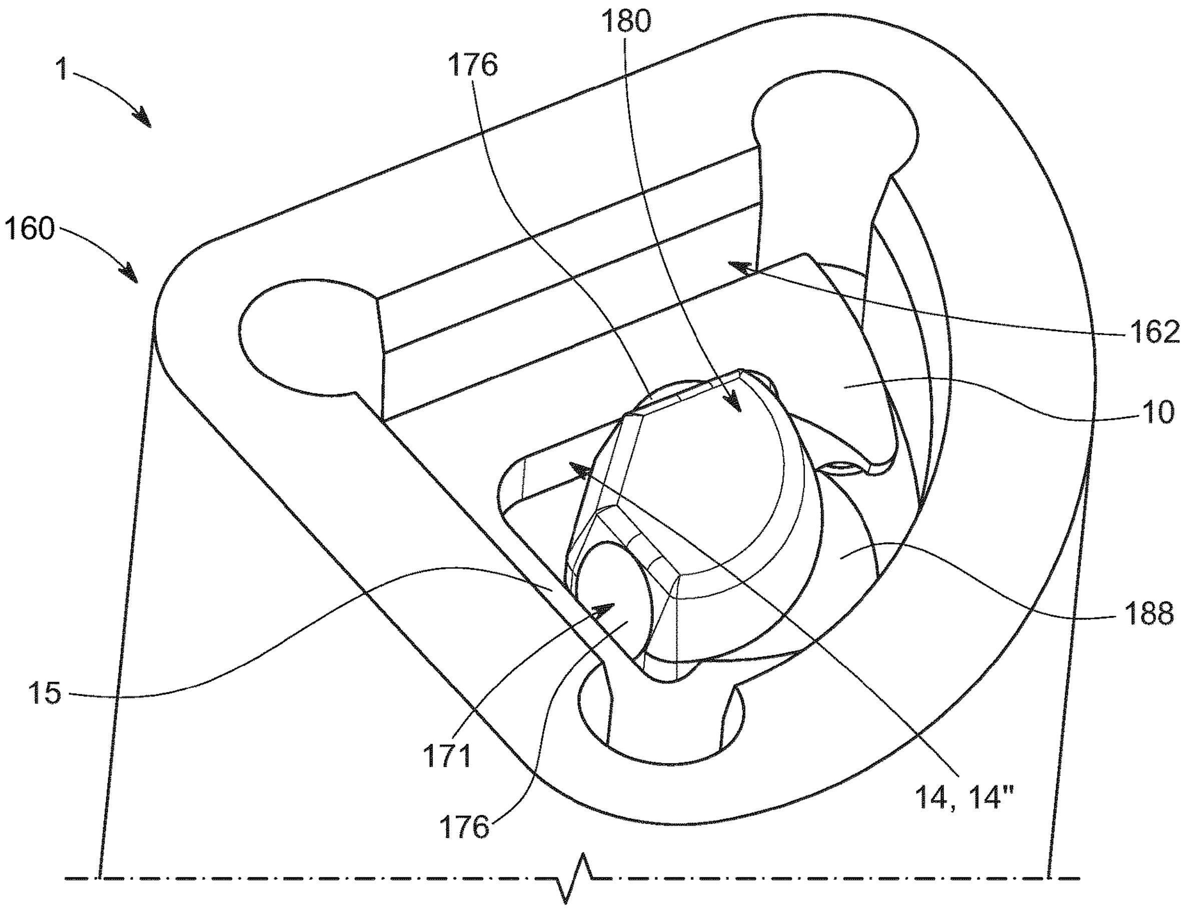
FIG. 11B, in a perspective view, shows the alignment jig of FIG. 11A with a workpiece held therein, and where the workpiece is represented as horizontal vertical section through the workpiece.

Preferably, and as shown in FIGS. 9, 11A and 11B, the second jaw 180 of the alignment jig 100 comprises two sets of first and second abutment surfaces 171, 172; 171', 172' arranged on two vertical surfaces 189', 189" of the second jaw 180. The two vertical surfaces 189', 189" are arranged in a wedge shape, and protruding from the second jaw 180.

Thus, the second jaw 180 comprises a first vertical surface 189', and a second vertical surface 189". The first vertical surface 189' and the second vertical surface 189" are arranged forming an angle between them, i.e. they form a wedge shape.

The first abutment surfaces 171 and the second abutment surface 172 is formed on the first vertical surface 189'. Preferably, on a hemispherical bulge 176 as described above. A second set of a first abutment surfaces 171' and a second abutment surface 172' is formed on one the other, the second vertical surface 189", preferably also on a hemispherical bulge 176 as described above.

This embodiment is suitable for workpieces having first and second alignment surfaces 14', 14" formed adjacent to each other and angled to each other in a wedge shaped indention, e.g. on inner surfaces of a workpiece 10, such as the second side surfaces 14' and 14". In some embodiments—not shown—these second side surfaces 14' and 14" acting as first and second alignment surfaces may replace first and second alignment surfaces on the outer surfaces of the workpiece. However, in the embodiments of FIGS. 9, 10A, 10B, 10C, 11A and 11B, the second side surfaces 14' and 14" on the inside of the workpiece acts in combination with the first and second alignment surfaces 61', 62' to improve the alignment.

As mentioned above, an alignment jig 100 as described in connection with FIGS. 8-11, as well as the embodiments described in connection with FIGS. 1-7 may form part of a holding system 1 for holding and aligning a workpiece 10 during after-treatment of the workpiece 10, where the holding system (1) comprises

- a workpiece 10; and
- an alignment jig 100 according to any of the above described embodiments, wherein the workpiece 10 comprises
- a first alignment surface 61, 61';
- a second alignment surface 62, 62' adjacent to and angled respective to the first alignment surface 61, 61', i.e. the first alignment surface 61, 61' and the second alignment surface 62, 62' are arranged in a wedge form.

Now returning to the embodiments described above in connection with FIGS. 8-11, it will be appreciated that the alignment jig 100 described, may (as it is the case with the alignment jig of the embodiments described in connection with FIGS. 1-7) comprise attachment means for coupling the alignment jig to a robot arm and/or to a main jig.

In one embodiment, a plurality of alignment jigs as described in connection with FIGS. 8-11 may be attached to a main jig in an array of alignment jigs, similar to the alignment jigs described in connection with the embodiments of FIGS. 1-7.

It is to be noted that the figures and the above description have shown the example embodiments in a simple and schematic manner. Many of the specific mechanical details have not been shown since the person skilled in the art should be familiar with these details and they would just unnecessarily complicate this description.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology as exemplified by the appended claims.

LIST OF PARTS

1 holding system for holding and aligning a workpiece/an injection moulded workpiece during after-treatment of the injection moulded workpiece
10 workpiece/injection moulded workpiece
11 body of workpiece
14 second side/second side surface of the workpiece
14' (first) surface section of second side/second side surface of the workpiece
14" (second) surface section of second side/second side surface of the workpiece
20 (first) sub-part of the workpiece
21 first end of sub-part of the workpiece
22 second end of sub-part of the workpiece
25 leg
26 foot
30 (second) sub-part of the workpiece
31 first end of second sub-part of the workpiece
32 second end of second sub-part of the workpiece
35 leg
36 foot
40 intermediary portion of the workpiece
41 first end of intermediary portion of the workpiece
42 second end of intermediary portion of the workpiece
43 first side/first side surface of intermediary portion of the workpiece
44 second side/second side surface of intermediary portion of the workpiece
50 weakening zone of reduced material thickness
51 indent in first side of intermediary portion of the workpiece
52 indent in second side of intermediary portion of the workpiece
61 first alignment surface on an intermediary portion of the workpiece
62 second alignment surface on an intermediary portion of the workpiece
61' first alignment surface on the workpiece
62' second alignment surface on the workpiece
70 abutment surface on second side of intermediary portion of the workpiece
100 alignment jig for holding the workpiece during after treatment;
100' plate body of alignment jig
100" main body of alignment jig
101 first end of plate body of alignment jig
102 second end of plate body of alignment jig
110 first workpiece support at first end of plate body of alignment jig
111 first arm of first workpiece support at first end of plate body of alignment jig
112 second arm of first workpiece support at first end of plate body of alignment jig
120 second workpiece support at second end of plate body of alignment jig
121 first arm of second workpiece support at second end of plate body of alignment jig
122 second arm of second workpiece support at second end of plate body of alignment jig
130 elevated plateau on plate body of alignment jig
140 side support for second jaw
141 first side flange of side support for second holder
142 second side flange of side support for second jaw
150 opening through plate body main body of alignment jig
160 first jaw
161 first alignment surface on first jaw of the jig
162 second alignment surface on first jaw of the jig
163 flange on first jaw
170 holding head/head portion
171 first abutment surface
171' first abutment surface
172 second abutment surface
172' second abutment surface
173 indention between first abutment surface and second abutment surface
174 body of holding head
175 cavity in body of holding head for receiving protruding knob of second jaw
176 hemispherical bulge
180 second jaw
181 body of second jaw
182 horizontal portion of body of second jaw
183 vertical portion of body of second jaw
184 abutment surface for abutment to spring
185 protruding knob
186 elongate body of second jaw
187 base of the elongate body of the second jaw
188 rod of the elongate body of the second jaw
189' (first) vertical surface of the rod of the elongate body of the second jaw
189" (second) vertical surface of the rod of the elongate body of the second jaw
190 hole for attaching alignment jig to main jig
200 main jig
210 block/main body of main jig
211 upper surface of main jig
220 mounting flange of main jig
230 spring
231 first end of spring
232 second end of spring
240 bore in block/main body of main jig for receiving spring
241 opening into bore from upper surface of block/main body of main jig
242 bottom of bore formed in block/main body of main jig
250 axle
290 bolt for mounting alignment jig on main jig
301 arrow representing upwardly directed force from spring
302 arrow representing horizontally directed force by second jaw towards the first jaw and the workpiece (when pressed into alignment jig)
303 arrow representing a horizontally directed force component by the holding head on the workpiece (when pressed into alignment jig)
304 arrow representing a downward directed force component by the holding head on the workpiece (when pressed into alignment jig)
305 arrow representing the force on the workpiece when pressing it into the alignment jig
L1 length from one end of workpiece to centre of workpiece
L2 length from opposite end of workpiece to centre of workpiece
P1 first pivot
P2 second pivot

What is claimed is:

1. An alignment system for holding a workpiece during after-treatment, the workpiece comprising: a first alignment surface; and a second alignment surface adjacent to and angled respective to the first alignment surface, wherein: the alignment system comprises a set of jaws configured to grab and hold the workpiece between a first jaw and a second jaw of the set of jaws, the second jaw is movably arranged relative to the first jaw; the first jaw comprises a first alignment surface configured for engaging the first alignment surface of the workpiece, the first jaw comprises a second alignment surface configured for engaging the second alignment surface of the workpiece, the second jaw comprises a first abutment surface, the first abutment surface being vertically arranged and configured for engaging a second side surface of the | workpiece, the second jaw further comprises a second abutment surface, the second abutment surface facing downwards, and being configure for engaging an upwardly facing surface of the workpiece, when the workpiece is inserted between the set of jaws of the alignment system, the second jaw is pivotally connected to the alignment system via an axle, and the second jaw has an upstanding spring wrapped around a column of the jaw, the upstanding spring configured to translate vertical force into rotational force via the axle, the axle configured to rotate the second jaw via the rotational force.

2. An alignment system according to claim 1, wherein the first alignment surface and the second alignment surface on the first jaw forms part of a wedge-shaped indentation in the first jaw.

3. An alignment system according to claim 1, wherein: the second jaw comprises two sets of first and second abutment surfaces arranged on two vertical surfaces of the second jaw, and the two vertical surfaces are arranged in a wedge shape protruding from the second jaw.

4. An alignment system according to claim 1, wherein: the second jaw comprises an elongate body having a base fixedly connected to the alignment system and rod connected to and extending from the base, and at least the rod is formed in an elastically resilient material.

5. An alignment system according to claim 1, wherein the workpiece comprises: two sub-parts; and an intermediary portion formed between the two sub-parts, wherein: the first alignment surface is formed in a first side surface of the intermediary portion; the second alignment surface is formed in the first side surface of the intermediary portion, the first abutment surface of the second jaw is configured for engaging a second side surface of the intermediary portion, the first alignment surface of the first jaw is configured for engaging the first alignment surface on the intermediary portion of the workpiece and the second alignment surface of the first jaw is configured for engaging the second alignment surface on the intermediary portion of the workpiece, and the first alignment surface and the second alignment surface on the first jaw are angled with respect to each other.

6. An alignment system according to claim 5, wherein the first alignment surface and the second alignment surface on the first jaw forms part of a wedge-shaped flange protruding from the first jaw.

7. An alignment system according to claim 6, wherein the wedge-shaped flange is formed centrally on the alignment system and configured to engage as centrally located wedge shaped indentation on the intermediary portion of the workpiece.

8. An alignment system according to claim 5, wherein the second jaw is biased in towards the first jaw.

9. An alignment system according to claim 5, wherein the second jaw is pivotally connected relative to the first jaw.

10. An alignment system according to claim 5, wherein the abutment surface of the second jaw is provided on a head portion which is pivotally connected to a body of the second jaw.

11. An alignment jig for holding and aligning a workpiece comprising:

a base configured to support the workpiece;

a first jaw extending from the base of the alignment jig, the first jaw having a wedge-shaped flange defining opposing, angled alignment surfaces;

a second jaw extending from the base of the alignment jig opposite the first jaw, the second jaw moveable relative to the base such that the second jaw is configured to clamp a workpiece inserted between the first and second jaw against the alignment surfaces; and a head piece configured for pivotal connection to the second jaw via ball and joint connection, the head piece defining an abutment surface opposite the ball and joint connection between the headpiece and the second jaw, the abutment surface for contacting the workpiece and configured to vertically align the workpiece relative to the base of the alignment jig by pushing the workpiece vertically against the base.

12. An alignment jig according to claim 11, wherein the abutment surface defines two separate contact surfaces having two separate force component vectors upon clamping the workpiece inserted between the first and second jaw.

13. An alignment jig according to claim 11, wherein the abutment surface is curved with two humps, the two humps configured for pushing the workpiece vertically against the base and horizontally against the first jaw.

14. An alignment jig according to claim 11, further comprising side supports extending from the base of the alignment jig for keeping the head piece in line with the first jaw.

15. An alignment jig according to claim 11, wherein:

the second jaw is pivotally connected to the alignment jig via an axle, and the second jaw has an upstanding spring wrapped around a column of the jaw, the upstanding spring configured to translate vertical force into rotational force via the axle, the axle configured to rotate the second jaw via the rotational force.

16. An alignment jig for holding and aligning a workpiece comprising:

an elongate main body defining a cavity, the cavity beginning at a mouth and extending in an interior of the elongate main body;

a first jaw defined by the mouth of the cavity, the first jaw having alignment surfaces; and a second jaw comprising a rod extending from a base, the base fixedly connected in the cavity of the elongate main body; the second jaw movably arranged relative to the first jaw and configured to provide a bias on the workpiece toward the alignment surfaces of the first jaw, therefore holding the workpiece between the first and second jaws.

17. An alignment jig according to claim 16, wherein the rod of the second jaw is bendable relative to the base, the rod also movably arranged relative to the main body of the alignment jig.

18. An alignment jig according to claim 16, wherein the second jaw defines two bulging abutment surfaces forming an angle therebetween, the abutment surfaces configured to make contact with the workpiece.

19. An alignment system for holding a workpiece during after-treatment, the workpiece comprising: a first alignment surface; and a second alignment surface adjacent to and angled respective to the first alignment surface, wherein: the alignment system comprises a set of jaws configured to grab and hold the workpiece between a first jaw and a second jaw of the set of jaws, the second jaw is movably arranged relative to the first jaw; the first jaw comprises a first alignment surface configured for engaging the first alignment surface of the workpiece, the first jaw comprises a second alignment surface configured for engaging the second alignment surface of the workpiece, the second jaw comprises a first abutment surface, the first abutment surface being vertically arranged and configured for engaging a second side surface of the workpiece, the second jaw further comprises a second abutment surface, the second abutment surface facing downwards, and being configure for engaging an upwardly facing surface of the workpiece, when the workpiece is inserted between the set of jaws of the alignment system, and the second jaw comprises an elongate body having a base fixedly connected to the alignment system and rod connected to and extending from the base, the rod formed in an elastically resilient material.

20. An alignment system for holding a workpiece during after-treatment, the workpiece comprising:

a first alignment surface; and a second alignment surface adjacent to and angled respective to the first alignment surface, wherein: the alignment system comprises a set of jaws configured to grab and hold the workpiece between a first jaw and a second jaw of the set of jaws, the second jaw is movably arranged relative to the first jaw; the first jaw comprises a first alignment surface configured for engaging the first alignment surface of the workpiece, the first jaw comprises a second alignment surface configured for engaging the second alignment surface of the workpiece, the second jaw comprises a first abutment surface, the first abutment surface being vertically arranged and configured for engaging a second side surface of the workpiece, the second jaw further comprises a second abutment surface, the second abutment surface facing downwards, and being configure for engaging an upwardly facing surface of the workpiece, when the workpiece is inserted between the set of jaws of the alignment system, the workpiece comprises two sub-parts and an intermediary portion formed between the two sub-parts, the first alignment surface is formed in a first side surface of the intermediary portion;

the second alignment surface is formed in the first side surface of the intermediary portion, the first abutment surface of the second jaw is configured for engaging a second side surface of the intermediary portion, the first alignment surface of the first jaw is configured for engaging the first alignment surface on the intermediary portion of the workpiece and the second alignment surface of the first jaw is configured for engaging the second alignment surface on the intermediary portion of the workpiece, and the first alignment surface and the second alignment surface on the first jaw are angled with respect to each other.

* * * * *